(12) United States Patent
Aiba et al.

(10) Patent No.: US 9,014,129 B2
(45) Date of Patent: *Apr. 21, 2015

(54) MOBILE COMMUNICATION SYSTEM, BASE STATION APPARATUS, MOBILE STATION APPARATUS, AND MOBILE COMMUNICATION METHOD

(71) Applicant: Sharp Kabushiki Kaisha, Osaka-shi, Osaka (JP)

(72) Inventors: Tatsushi Aiba, Osaka (JP); Shohei Yamada, Osaka (JP); Shoichi Suzuki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/280,522

(22) Filed: May 16, 2014

(65) Prior Publication Data

US 2014/0254522 A1    Sep. 11, 2014

Related U.S. Application Data

(63) Continuation of application No. 13/322,882, filed as application No. PCT/JP2010/058179 on May 14, 2010, now Pat. No. 8,767,651.

(30) Foreign Application Priority Data

May 26, 2009    (JP) .................................. 2009-125928

(51) Int. Cl.
*H04W 72/04* (2009.01)
*H04W 72/02* (2009.01)
(Continued)

(52) U.S. Cl.
CPC ............... *H04W 72/02* (2013.01); *H04L 5/001* (2013.01); *H04L 5/0037* (2013.01); *H04L 5/0053* (2013.01); *H04W 72/1257* (2013.01); *H04L 1/1664* (2013.01); *H04W 72/0406* (2013.01)

(58) Field of Classification Search
CPC .................... H04W 72/0406; H04W 72/1257; H04W 72/02; H04W 72/04
See application file for complete search history.

(56) References Cited

U.S. PATENT DOCUMENTS 5,956,642 A * 9/1999 Larsson et al. ................ 455/449
2002/0055360 A1 * 5/2002 Chen et al. ..................... 455/452

(Continued)

FOREIGN PATENT DOCUMENTS

JP    2002-112326 A    4/2002
JP    2008-172366 A    7/2008

OTHER PUBLICATIONS

Issues on Carrier Aggregation for Advanced E-UTRA, Texas Instruments, Nov. 10-14, 2008, Prague, Czech Republic, pp. 1-5, R1-084443, 3GPP.

(Continued)

*Primary Examiner* — Chirag Shah
*Assistant Examiner* — Rina Pancholi
(74) *Attorney, Agent, or Firm* — Birch, Stewart, Kolasch & Birch, LLP

(57) ABSTRACT

A mobile station (MS) receives in a sub-frame a first and second PDCCH, where the first PDCCH indicating a first PDSCH transmission on a first downlink component carrier (DCC) and the second PDCCH indicating a second PDSCH transmission on the second DCC, determines a first PUCCH resource based on a control channel element (CCE) of the first PDCCH and a second PUCCH resource based on a CCE of the second PDCCH when the first PDCCH and the second DCC are received in the sub-frame and transmits control information on HARQ using a single PUCCH resource (selected from the first and second PUCCH resource), where the first and second PUCCH resource are mapped on a single uplink component carrier corresponding to the first DCC, and the control information on HARQ includes information indicating an ACK or a NACK for each of downlink transport blocks transmitted on the first and second PDSCH.

4 Claims, 11 Drawing Sheets

(51) Int. Cl.
*H04L 5/00* (2006.01)
*H04W 72/12* (2009.01)
*H04L 1/16* (2006.01)

(56) References Cited

U.S. PATENT DOCUMENTS

| | | | |
|---|---|---|---|
| 2003/0039270 A1* | 2/2003 | Chang et al. | 370/469 |
| 2010/0210256 A1* | 8/2010 | Shen et al. | 455/422.1 |
| 2010/0271970 A1* | 10/2010 | Pan et al. | 370/252 |
| 2010/0272048 A1* | 10/2010 | Pan et al. | 370/329 |
| 2011/0194499 A1* | 8/2011 | Aiba et al. | 370/328 |
| 2011/0194516 A1* | 8/2011 | Aiba et al. | 370/329 |
| 2011/0228731 A1* | 9/2011 | Luo et al. | 370/329 |
| 2011/0268032 A1* | 11/2011 | Kim et al. | 370/328 |
| 2012/0106569 A1* | 5/2012 | Che et al. | 370/437 |
| 2012/0243497 A1* | 9/2012 | Chung et al. | 370/329 |
| 2012/0307781 A1* | 12/2012 | Enomoto et al. | 370/329 |
| 2013/0083709 A1* | 4/2013 | Ahn et al. | 370/280 |

OTHER PUBLICATIONS

Uplink Control Channel Design for LTE-Advanced, ZTE, Jan. 12-16, 2009, Ljubljana, Slovenia, pp. 1-4, R1-090078, 3GPP.

CMCC Huawei, "PDCCH Design of Carrier Aggregation", 3GPP TSG RN WG1 meeting #57, R1-091829, May 4-8, 2009, San Francisco, CA, pp. 1-3.

International Search Report, dated Jun. 29, 2010 in PCT/JP2010/058179.

LG Electronics, "HARQ process mapping across aggregated component carriers", 3GPP TSG RAN WG1 #56bis, R1-081202, Mar. 23-27, 2009, Seoul, Korea, pp. 1-3.

LG Electronics, "HARQ process mapping across aggregated component carriers", 3GPP TSG RAN WG1 #57, R1-092125, May 4-8, 2009, San Francisco, CA, pp. 1-3.

LG Electronics, "UL ACK/NACK control channel design", 3GPP TSG RAN WG1 #57, R1-092123, May 4-8, 2009, San Francisco, CA, pp. 1-7.

Nokia Siemens Networks, Nokia, "UL control signalling to support bandwidth extension in LTE-Advanced", 3GPP TSG RAN WG1 Meeting #55bis, R1-090234, Jan. 12-16, 2009, Ljubljana, Slovenia, pp. 1-5.

Non-Final Office Action dated Aug. 1, 2013 issued in U.S. Appl. No. 13/322,882.

Notice of Allowance dated Feb. 19, 2014 issued in U.S. Appl. No. 13/322,882.

NTT DOCOMO, "Initial Access Procedure for Asymmetric Wider Bandwidth in LTE-Advanced", 3GPP TSG RAN WG1 Meeting #55, R1-084249, Nov. 10-14, 2008, pp. 1-5.

Texas Instruments, "Downlink and Uplink Control to Support Carrier Aggregation", 3GPP TSG RAN WG1 #56bis, R1-091295, Mar. 23-27, 2009, Seoul, Korea, pp. 1-5.

\* cited by examiner

MOBILE COMMUNICATION SYSTEM, BASE STATION APPARATUS, MOBILE STATION APPARATUS, AND MOBILE COMMUNICATION METHOD

This application is a Continuation of co-pending application Ser. No. 13/322,882 filed on Dec. 6, 2011, for which priority is claimed under 35 U.S.C. §120, application Ser. No. 13/322,882 is the national phase of PCT International Application No. PCT/JP2010/058179 filed on May 14, 2010 under 35 U.S.C. §371, which claims the benefit of priority of JP2009-125928 filed May 26, 2009. The entire contents of each of the above-identified applications are hereby incorporated by reference.

TECHNICAL FIELD

The present invention relates to a mobile communication system made up of a base station apparatus and a mobile station apparatus, and a mobile communication method.

BACKGROUND ART

3GPP (3rd Generation Partnership Project) is a project for discussing/creating specifications of a mobile communication system based on a network developed from W-CDMA (Wideband-Code Division Multiple Access) and GSM (Global System for Mobile Communications). The 3GPP has standardized the W-CDMA mode as a third-generation cellular mobile communication system and the service is sequentially started. HSDPA (High-Speed Downlink Packet Access) with higher communication speed has also been standardized and the service is started. The 3GPP is currently discussing about a mobile communication system (hereinafter referred to as "LTE-A (Long Term Evolution-Advanced)" or "Advanced-EUTRA") that utilizes the development of the third generation radio access technology (hereinafter referred to as "LTE (Long Term Evolution)" or "EUTRA (Evolved Universal Terrestrial Radio Access)") and a wider frequency band to realize faster data transmission/reception.

The OFDMA (Orthogonal Frequency Division Multiple Access) mode and the SC-FDMA (Single Carrier-Frequency Division Multiple Access) mode are modes using subcarriers orthogonal to each other to perform user-multiplexing and are discussed as communication modes in LTE. The OFDMA mode is a multi-carrier communication mode and is proposed for downlink, and the SC-FDMA mode is a single-carrier communication mode and is proposed for uplink.

On the other hand, for communication modes in LTE-A, it is discussed to introduce the OFDMA mode for downlink and the OFDMA mode and the Clustered-SC-FDMA (Clustered-Single Carrier-Frequency Division Multiple Access, also referred to as DFT-s-OFDM with Spectrum Division Control) mode for uplink in addition to the SC-FDMA mode. The SC-FDMA mode proposed as uplink communication mode in LTE and LTE-A are characterized in that PAPR (Peak to Average Power Ratio) at the time of transmission of data (information) can be suppressed to a lower level.

While a typical mobile communication system uses a continuous frequency band, it is discussed for LTE-A to use a plurality of continuous/discontinuous frequency bands (hereinafter, referred to as "carrier elements, carrier components (CC)" or "element carriers, component carriers (CC)") in a multiple manner to implement operation as one frequency band (broad frequency band) (frequency band aggregation, also referred to as spectrum aggregation, carrier aggregation, and frequency aggregation). It is also proposed to give different frequency bandwidths to a frequency band used in downlink communication and a frequency band used in uplink communication so that the base station apparatus and the mobile station apparatus more flexibly use a wider frequency band to perform communication (asymmetric frequency band aggregation: asymmetric carrier aggregation) (Nonpatent Literature 1).

FIG. 9 is a diagram for explaining frequency band aggregation in a conventional technique. Giving the same bandwidth to a frequency band used in downlink (DL) communication and a frequency band used in uplink (UL) communication as depicted in FIG. 9 is also referred to as symmetric frequency band aggregation (symmetric carrier aggregation). As depicted in FIG. 9, the base station apparatus and the mobile station apparatus use the plurality of carrier components that are continuous/discontinuous frequency bands in a multiple manner, thereby performing communication in a wider frequency band constituted of the plurality of carrier components. Here, byway of example, it is depicted that a frequency band used in the downlink communication with a bandwidth of 100 MHz (hereinafter also referred to as DL system band or DL system bandwidth) is constituted of five carrier components (DCC1: Downlink Component Carrier 1, DCC2, DCC3, DCC4, and DCC5) each having a bandwidth of 20 MHz. By way of example, it is also depicted that a frequency band used in the uplink communication with a bandwidth of 100 MHz (hereinafter also referred to as UL system band or UL system bandwidth) is constituted of five carrier components (UCC1: Uplink Component Carrier 1, UCC2, UCC3, UCC4, and UCC5) each having a bandwidth of 20 MHz.

In FIG. 9, downlink channels such as a physical downlink control channel (hereinafter, PDCCH) and a physical downlink shared channel (hereinafter, PDSCH) are mapped on each of the downlink carrier components, and the base station apparatus uses the PDCCH to transmit, to the mobile station apparatus, the control information (such as resource allocation information, MCS (Modulation and Coding Scheme) information, and HARQ (Hybrid Automatic Repeat Request) process information) for transmitting a downlink transport block transmitted by using the PDSCH (i.e. uses the PDCCH to allocate the PDSCH to the mobile station apparatus), and uses the PDSCH to transmit the downlink transport block to the mobile station apparatus.

Also, uplink channels such as a physical uplink control channel (hereinafter, PUCCH) and a physical uplink shared channel (hereinafter, PUSCH) are mapped on each of the uplink carrier components, and the mobile station apparatus uses the PUCCH and/or the PUSCH mapped on each of the uplink carrier components to transmit, to the base station apparatus, the control signal (control information) of HARQ for the physical downlink control channel and/or the downlink transport blocks. The control signal (control information) of HARQ is a signal (information) indicative of ACK/NACK (Positive Acknowledgement/Negative Acknowledgement, ACK signal or NACK signal) and/or a signal (information) indicative of DTX (Discontinuous Transmission) for the physical downlink control channel and/or the downlink transport blocks. The signal indicative of DTX is a signal (information) indicating that the mobile station apparatus cannot detect the PDCCH from the base station apparatus. In FIG. 9, any of downlink/uplink channels such as the PDCCH, the PDSCH, the PUCCH, and the PUSCH may not be mapped on some downlink/uplink carrier components.

Similarly, FIG. 10 is a diagram for explaining asymmetric frequency band aggregation (asymmetric carrier aggregation) in a conventional technique. As depicted in FIG. 10, the base station apparatus and the mobile station apparatus give different bandwidths to a frequency band used in the downlink communication and a frequency band used in the uplink communication, and use the carrier components constitute these frequency bands in a multiple manner, thereby performing communication in a wider frequency band. Here, by way of example, it is depicted that a frequency band used in the downlink communication with a bandwidth of 100 MHz is constituted of five carrier components (DCC1, DCC2, DCC3, DCC4, and DCC5) each having a bandwidth of 20 MHz, and that a frequency band used in the uplink communication with a bandwidth of 40 MHz is constituted of two carrier components (UCC1 and UCC2) each having a bandwidth of 20 MHz. In FIG. 10, the downlink/uplink channels are mapped on each of the downlink/uplink carrier components, and the base station apparatus uses the PDSCHs to be allocated by the PDCCHs to transmit, to the mobile station apparatus, the downlink transport blocks in the same sub-frame, and the mobile station apparatus uses the PUSCH and/or the PUSCH to transmit, to the base station apparatus, the control signal of HARQ.

For the LTE-A, various methods have been proposed for the base station apparatus to employ when the base station apparatus executes allocation of the PDSCHs using the PDCCHs mapped on the downlink carrier components (Non-patent Literature 2). FIG. 11 is a diagram for explaining one of the methods of allocating the PDSCHs using the PDCCHs in the conventional techniques. FIG. 11 depicts an enlarged portion of the downlink carrier components in FIG. 10 (a portion including DCC1, DCC2, and DCC3). As depicted in FIG. 11, the base station apparatus is able to allocate the plurality of PDSCHs using the plurality of PDCCHs mapped on a single downlink carrier component. FIG. 11 depicts the state as an example where the base station apparatus allocates the PDSCHs mapped on DCC1, DCC2, and DCC3 using three PDCCHs mapped on DCC2 (the PDCCHs each indicated by slant lines, grid lines, or net lines) (allocates the PDSCH of DCC1 using the PDCCH indicated by the slant lines, the PDSCH of DCC2 using the PDCCH indicated by the grid lines, and the PDSCH of DCC3 using the PDCCH indicated by the net lines). The base station apparatus is able to transmit to the mobile station apparatus (at most three) downlink transport block(s) in one same sub frame using the PDSCHs mapped on DCC1, DCC2, and DCC3.

PRIOR ART DOCUMENTS

Nonpatent Literatures

Nonpatent Literature 1: "Initial Access Procedure for Asymmetric Wider Bandwidth in LTE-Advanced", 3GPP TSG RAN WG1 Meeting #55, R1-084249, Nov. 10-14, 2008
Nonpatent Literature 2: "PDCCH Design of Carrier Aggregation", 3GPP TSG RAN WG1 Meeting #57, R1-091829, May 4-8, 2009

SUMMARY OF THE INVENTION

Problem to be Solved by the Invention

However, it is not clear according to the conventional techniques how the mobile station apparatus transmits, to the base station apparatus, the control signal of HARQ for the plurality of PDCCHs and/or the plurality of downlink transport blocks when the base station apparatus allocates the plurality of PDSCHs using the plurality of PDCCHs, and transmits, to the mobile station apparatus, the plurality of downlink transport blocks in the same one sub frame using the plurality of PDSCHs allocated.

When the base station apparatus and the mobile station apparatus transmit or receive the control signal of HARQ, the resources for the mobile station apparatus to map the control signal of HARQ must efficiently be allocated by the base station apparatus. For example, when the base station apparatus explicitly designates all of the resources to be mapped the control signal of HARQ for the mobile station apparatus that transmits the control signal of HARQ, the radio resources used for the designation are partially wasted. A method is desired for the base station apparatus to efficiently designate the resources for the mobile station apparatus to map the control signal of HARQ.

As above, a problem arises in the conventional techniques that the method is inefficient of designating the resources to be mapped the control signal of HARQ by the base station apparatus when the base station apparatus allocates the plurality of PDSCHs using the plurality of PDCCHs, and transmits, to the mobile station apparatus, the plurality of downlink transport blocks in the same one sub frame using the plurality of the PDSCHs allocated.

The present invention was conceived in view of the above circumstances and the object thereof is to provide a mobile communication system and a mobile communication method that take into account a method of designating the resources to be mapped the control signal of HARQ by a base station apparatus.

Means for Solving the Problem

To accomplish the above purpose, the present invention uses the following means. A mobile communication system of the present invention is a mobile communication system in which the base station apparatus and the mobile station apparatus communicate using the plurality of component carriers, comprising: the base station apparatus transmits, to the mobile station apparatus, a first physical downlink control channel for indicating transmission of a physical downlink shared channel on a specific downlink component carrier and a second physical downlink control channel for indicating transmission of a physical downlink shared channel on a downlink component carrier different from the specific downlink component carrier, in a sub frame on the specific downlink component carrier, the mobile station apparatus transmits, to the base station apparatus, control information on HARQ using either one of a first physical uplink control channel resource corresponding to a resource of the first physical downlink control channel and a second physical uplink control channel resource corresponding to a resource of the second physical downlink control channel, when the first physical downlink control channel and the second physical downlink control channel are received, from the base station apparatus, in a sub frame on the specific downlink component carrier, wherein the first physical uplink control channel resource and the second physical uplink control channel resource are mapped on a single uplink component carrier that corresponds to the specific downlink component carrier.

Further, the mobile communication system of the present invention is the mobile communication system, wherein the resource of the first physical downlink control channel includes control channel elements that constitute the first physical downlink control channel, and the mobile communication system of the present invention is the mobile communication system, wherein the resource of the second physical downlink control channel includes control channel elements that constitute the second physical downlink control channel.

Further, the mobile communication system of the present invention is the mobile communication system, wherein the specific downlink component carrier is indicated, by the base station apparatus, to the mobile station apparatus.

Further, the mobile communication system of the present invention is the mobile communication system, wherein a correspondence between the specific downlink component carrier and the uplink component carrier is set, by the base station apparatus, in the mobile station apparatus specifically to a cell.

Further, the mobile communication system of the present invention is the mobile communication system, wherein a correspondence between the specific downlink component carrier and the uplink component carrier is set, by the base station apparatus, in the mobile station apparatus specifically to the mobile station apparatus.

Further, the mobile communication system of the present invention is the mobile communication system, wherein the control information on HARQ includes information that indicates ACK/NACK for each of downlink transport blocks transmitted on the specific downlink component carrier and the downlink component carrier different from the specific downlink component carrier.

Further, the base station apparatus of the present invention is the base station apparatus that communicates with the mobile station apparatus using a plurality of component carriers, comprising: a portion that transmits, to the mobile station apparatus, a first physical downlink control channel for indicating transmission of a physical downlink shared channel on a specific downlink component carrier and a second physical downlink control channel for indicating transmission of a physical downlink shared channel on a downlink component carrier different from the specific downlink component carrier, in a sub frame on the specific downlink component carrier; and a portion that receives, from the mobile station apparatus, control information on HARQ using either one of a first physical uplink control channel resource corresponding to a resource of the first physical downlink control channel and a second physical uplink control channel resource corresponding to a resource of the second physical downlink control channel, when the mobile station apparatus receives the first physical downlink control channel and the second physical downlink control channel in a sub frame on the specific downlink component carrier, wherein the first physical uplink control channel resource and the second physical uplink control channel resource are mapped on a single uplink component carrier that corresponds to the specific downlink component carrier.

Further, the mobile station apparatus of the present invention is the mobile station apparatus that communicates with the base station apparatus using a plurality of component carriers, comprising a portion that transmits, to the base station apparatus, control information on HARQ using either one of a first physical uplink control channel resource corresponding to a resource of a first physical downlink control channel and a second physical uplink control channel resource corresponding to a resource of a second physical downlink control channel, when the first physical downlink control channel for indicating transmission of a physical downlink shared channel on a specific downlink component carrier and the second physical downlink control channel for indicating transmission of a physical downlink shared channel on a downlink component carrier different from the specific downlink component carrier are received, from the base station apparatus, in a sub frame on the specific downlink component carrier, wherein the first physical uplink control channel resource and the second physical uplink control channel resource are mapped on a single uplink component carrier that corresponds to the specific downlink component carrier.

Further, the communication method of the present invention is the communication method of the base station apparatus that communicates with the mobile station apparatus using a plurality of component carriers, comprising: transmitting, to the mobile station apparatus, a first physical downlink control channel for indicating transmission of a physical downlink shared channel on a specific downlink component carrier and second physical downlink control channel for indicating transmission of a physical downlink shared channel on a downlink component carrier different from the specific downlink component carrier in a sub frame on the specific downlink component carrier, receiving, from the mobile station apparatus, control information on HARQ using either one of a first physical uplink control channel resource corresponding to a resource of the first physical downlink control channel and a second physical uplink control channel resource corresponding to a resource of the second physical downlink control channel, when the mobile station apparatus receives the first physical downlink control channel and the second physical downlink control channel in a sub frame on the specific downlink component carrier, wherein the first physical uplink control channel resource and the second physical uplink control channel resource are mapped on a single uplink component carrier that corresponds to the specific downlink component carrier.

Further, the communication method of the present invention is the communication method of the mobile station apparatus that communicates with the base station apparatus using a plurality of component carriers, comprising: transmitting, to the base station apparatus, control information on HARQ using either one of a first physical uplink control channel resource corresponding to a resource of a first physical downlink control channel and a second physical uplink control channel resource corresponding to a resource of a second physical downlink control channel, when the first physical downlink control channel for indicating transmission of a physical downlink shared channel on a specific downlink component carrier and the second physical downlink control channel for indicating transmission of a physical downlink shared channel on a downlink component carrier different from the specific downlink component carrier are received, from the base station apparatus, in a sub frame on the specific downlink component carrier, wherein the first physical uplink control channel resource and the second physical uplink control channel resource are mapped on a single uplink component carrier that corresponds to the specific downlink component carrier.

Further, the base station apparatus of the present invention is the base station apparatus, further comprising a means that, in the uplink component carrier, sets in the mobile station apparatus a resource area available for mapping therein the plurality of physical uplink control channels.

Further, a mobile station apparatus of the present invention is a mobile station apparatus in a mobile communication system having a base station apparatus and the mobile station apparatus that execute communication therebetween using a plurality of component carriers, comprising: a means that is set therein one downlink component carrier by the base station apparatus; a means that is allocated thereto by the base station apparatus with a plurality of physical downlink shared channels in the same sub frame using a plurality of physical downlink control channels mapped on the downlink component carrier set; and a means for which a plurality of physical uplink control channels corresponding one-to-one to the plurality of physical downlink control channels mapped on the downlink component carrier set are designated by the base station apparatus in one uplink component carrier corresponding to the downlink component carrier set.

Further, a mobile station apparatus of the present invention is a mobile station apparatus in a mobile communication system having a base station apparatus and the mobile station apparatus that execute communication therebetween using a plurality of component carriers, comprising: a means that is set therein a correlation between a downlink component carrier and an uplink component carrier by the base station apparatus using broadcast information; a means that is set therein the one downlink component carrier by the base station apparatus; a means that is allocated thereto by the base station apparatus with a plurality of physical downlink shared channels in the same sub frame using a plurality of physical downlink control channels mapped on the downlink component carrier set; and a means for which a plurality of physical uplink control channels corresponding one-to-one to the plurality of physical downlink control channels mapped on the downlink component carrier set are designated by the base station apparatus in the one uplink component carrier corresponding to the downlink component carrier set.

Further, a mobile station apparatus of the present invention is a mobile station apparatus in a mobile communication system having a base station apparatus and the mobile station apparatus that execute communication therebetween using a plurality of component carriers, comprising: a means that is set therein a correlation between a downlink component carrier and an uplink component carrier by the base station apparatus using RRC signaling; a means that is set therein the one downlink component carrier by the base station apparatus; a means that is allocated thereto by the base station apparatus with a plurality of physical downlink shared channels in the same sub frame using a plurality of physical downlink control channels mapped on the downlink component carrier set; and a means for which a plurality of physical uplink control channels corresponding one-to-one to the plurality of physical downlink control channels mapped on the downlink component carrier set are designated by the base station apparatus in the one uplink component carrier corresponding to the downlink component carrier set.

Further, the mobile station apparatus of the present invention is the mobile station apparatus, further comprising a means that is set therein a resource area available for mapping therein the plurality of physical uplink control channels, by the base station apparatus in the uplink component carrier.

Further, the mobile station apparatus of the present invention is the mobile station apparatus, further comprising: a means that maps control information on HARQ on any one physical uplink control channel of the plurality of physical uplink control channels, the means transmitting the control information to the base station apparatus.

Further, the mobile station apparatus of the present invention is the mobile station apparatus, wherein the control information on HARQ comprises information that indicates ACK/NACK for a downlink transport block mapped on the plurality of physical downlink shared channels.

Further, the mobile station apparatus of the present invention is the mobile station apparatus, wherein the control information on HARQ comprises information indicating that the mobile station apparatus fails to detect the physical downlink control channels.

Effect of the Invention

According to the present invention, the base station apparatus and the mobile station apparatus that each execute communication using a wideband frequency band including the plurality of consecutive or non-consecutive frequency bands (carrier components), are able to efficiently transmit and receive the control signal of HARQ.

MODES FOR CARRYING OUT THE INVENTION

Figure 1:
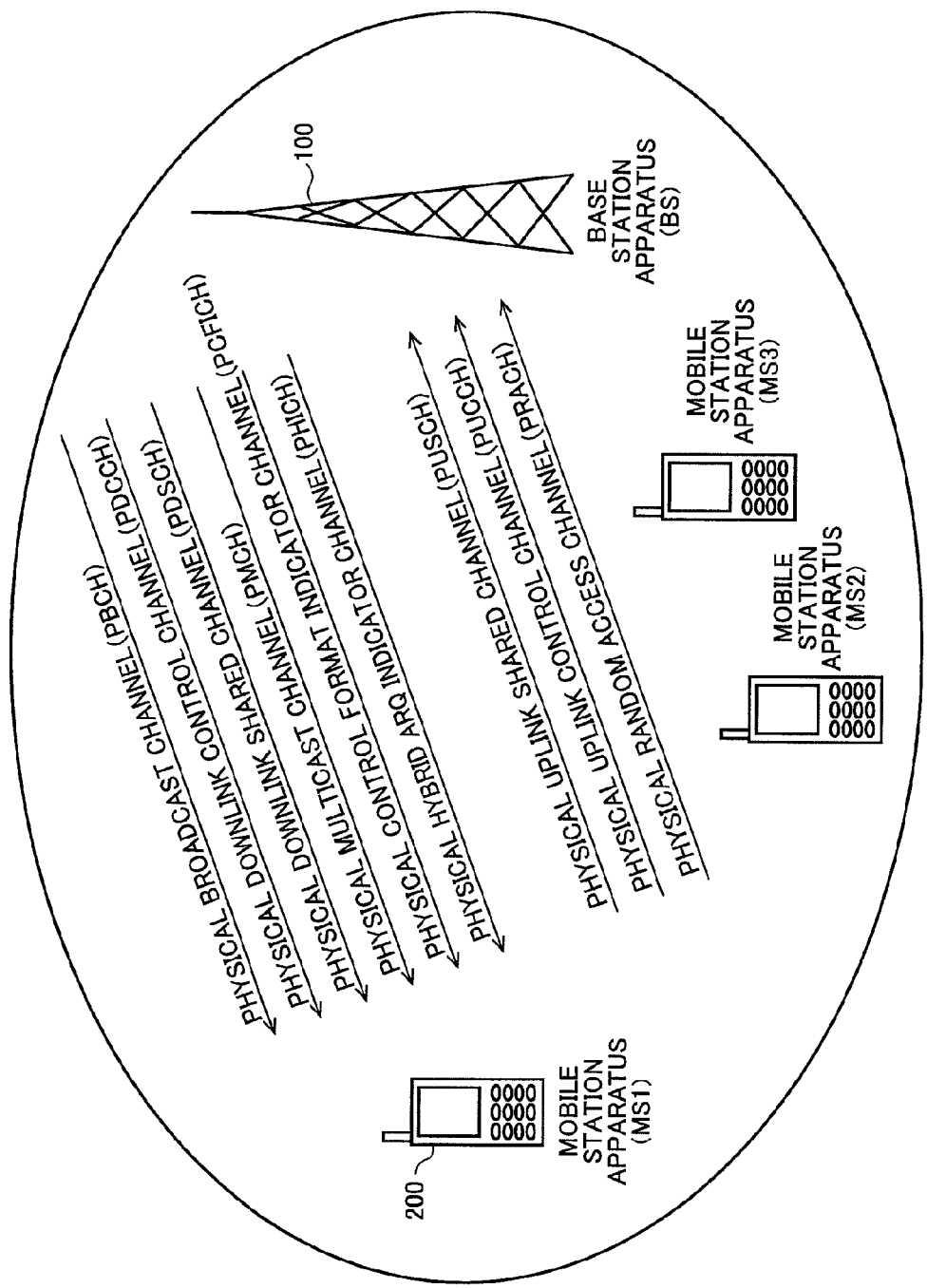
FIG. 1 is a conceptual diagram of a configuration of physical channels.

Embodiments according to the present invention will now be described with reference to the drawings. FIG. 1 is a diagram of one exemplary configuration of channels of an embodiment of the present invention. Downlink physical channels are made up of a physical broadcast channel (PBCH), a physical downlink control channel (PDCCH), a physical downlink shared channel (PDSCH), a physical multicast channel (PMCH), a physical control format indicator channel (PCFICH), and a physical hybrid ARQ indicator channel (PHICH). Uplink physical channels are made up of a physical uplink shared channel (PUSCH), a physical uplink control channel (PUCCH), and a physical random access channel (PRACH).

The physical broadcast channel (PBCH) maps the broadcast channel (BCH) at intervals of 40 milliseconds. The blind detection is performed for the timing of 40 milliseconds. Therefore, explicit signaling is not performed for the presentation of the timing. A sub-frame including the physical broadcast channel (PBCH) can be decoded by itself (self-decodable).

The physical downlink control channel (PDCCH) is a channel used for notifying the mobile station apparatus of the resource allocation of the physical downlink shared channel (PDSCH), the hybrid automatic repeat request (HARQ) information for downlink data, and an uplink transmission permission that is the resource allocation of the physical uplink shared channel (PUSCH). The PDDCH is constituted of a plurality of control channel elements (CCE), and the mobile station apparatus detects the PDCCH constituted of CCEs to receive the PDCCH from the base station apparatus. The CCE is constituted of a plurality of resource element groups (REG, also referred as mini-CCE) distributed in frequency and time domains. The resource element is a unit resource constituted of one OFDM symbol (time domain) and one sub-carrier (frequency domain) and, for example, the REG is constituted of four downlink resource elements consecutive in the frequency domain, except the downlink pilot channel, in the frequency domain in the same OFDM symbol. For example, one PDCCH is constituted of one, two, four, and eight CCEs having the consecutive numbers identifying CCEs (CCE index).

The PDCCH is separately coded (separate coding is applied) by each mobile station apparatus and by each type. Therefore, the mobile station apparatus detects the plurality of PDCCHs and acquires downlink or uplink resource allocation and information indicative of other control signals. A value of CRC (cyclic redundancy check) enabling format identification is added to each PDCCH and the mobile station apparatus performs CRC for each set of CCEs that may constitute the PDCCH and acquires the PDCCH of successful CRC. This is referred to as blind decoding and, with regard to a set of CCEs that may constitute the PDCCH which the blind decoding is performed, the range thereof is referred to as a search space. The mobile station apparatus performs the blind decoding for CCEs in the search space to detect the PDCCH.

If the PDCCH includes resource allocation of the physical downlink shared channel (PDSCH), the mobile station apparatus uses the physical downlink shared channel (PDSCH) to receive data (downlink data (downlink shared channel (DL-SCH)), and/or downlink control data) in accordance with the resource allocation specified by the PDCCH from the base station apparatus. Therefore, the PDCCH is used for transmitting a signal that performs resource allocation to downlink (hereinafter referred to as "downlink transmission permission signal" or "downlink grant"). If the PDCCH includes resource allocation of the uplink shared channel, the mobile station apparatus uses the physical uplink shared channel (PUSCH) to transmit data (uplink data (uplink shared channel (UL-SCH)), and/or uplink control data) in accordance with the resource allocation specified by the PDCCH from the base station apparatus. Therefore, the PDCCH is used for transmitting a signal that permits data transmission to uplink (hereinafter referred to as "uplink transmission permission signal" or "uplink grant").

The physical downlink shared channel (PDSCH) is a channel used for transmitting the downlink data (the downlink shared channel: the DL-SCH) or paging information (paging channel: PCH). The physical multicast channel (PMCH) is a channel utilized for transmitting a multicast channel (MCH), and a downlink reference signal, an uplink reference signal, and a physical downlink synchronization signal are separately disposed.

The transmission of the downlink data (the DL-SCH) indicates transmission of user data, for example, and the DL-SCH is a transport channel. The DL-SCH supports HARQ and dynamic adaptive radio link control, and can utilize the beamforming. The DL-SCH supports dynamic resource allocation and quasi-static resource allocation.

The physical uplink shared channel (PUSCH) is a channel mainly used for transmitting the uplink data (the uplink shared channel: the UL-SCH). If the base station apparatus schedules the mobile station apparatus, control data is also transmitted by using the PUSCH. This control data includes channel state information, for example, a downlink channel quality indicator (CQI), a precoding matrix indicator (PMI), a rank indicator (RI), and ACK/NACK of HARQ for downlink transmission (downlink transport blocks).

The transmission of the uplink data (the UL-SCH) indicates transmission of user data, for example, and the UL-SCH is a transport channel. The UL-SCH supports HARQ and dynamic adaptive radio link control, and can utilize the beamforming. The UL-SCH supports dynamic resource allocation and quasi-static resource allocation.

The uplink data (the UL-SCH) and the downlink data (the DL-SCH) may include radio resource control signals exchanged between the base station apparatus and the mobile station apparatus (hereinafter referred to as "RRC signaling: Radio Resource Control Signaling"), MAC (Medium Access Control) control elements, etc.

The physical uplink control channel (PUCCH) is a channel used for transmitting the control data. The control data includes, for example, the channel state information (CQI, PMI, RI) transmitted (fed back) from the mobile station apparatus to the base station apparatus, a scheduling request (SR) that requests resource allocation for transmission of the uplink data by the mobile station apparatus (or that requests transmission through the UL-SCH), and ACK/NACK of HARQ for the downlink transmission (the downlink transport blocks).

The physical control format indicator channel (PCFICH) is a channel utilized for notifying the mobile station apparatus of the number of OFDM symbols used for the PDCCH and is transmitted in sub-frames. The physical hybrid ARQ indicator channel (PHICH) is a channel utilized for transmitting ACK/NACK used for HARQ of the uplink data. The physical random access channel (PRACH) is a channel used for transmitting a random access preamble and has a guard time. As depicted in FIG. 1, a mobile communication system according to this embodiment is made up of a base station apparatus 100 and mobile station apparatuses 200.

[Configuration of Base Station Apparatus]

Figure 2:
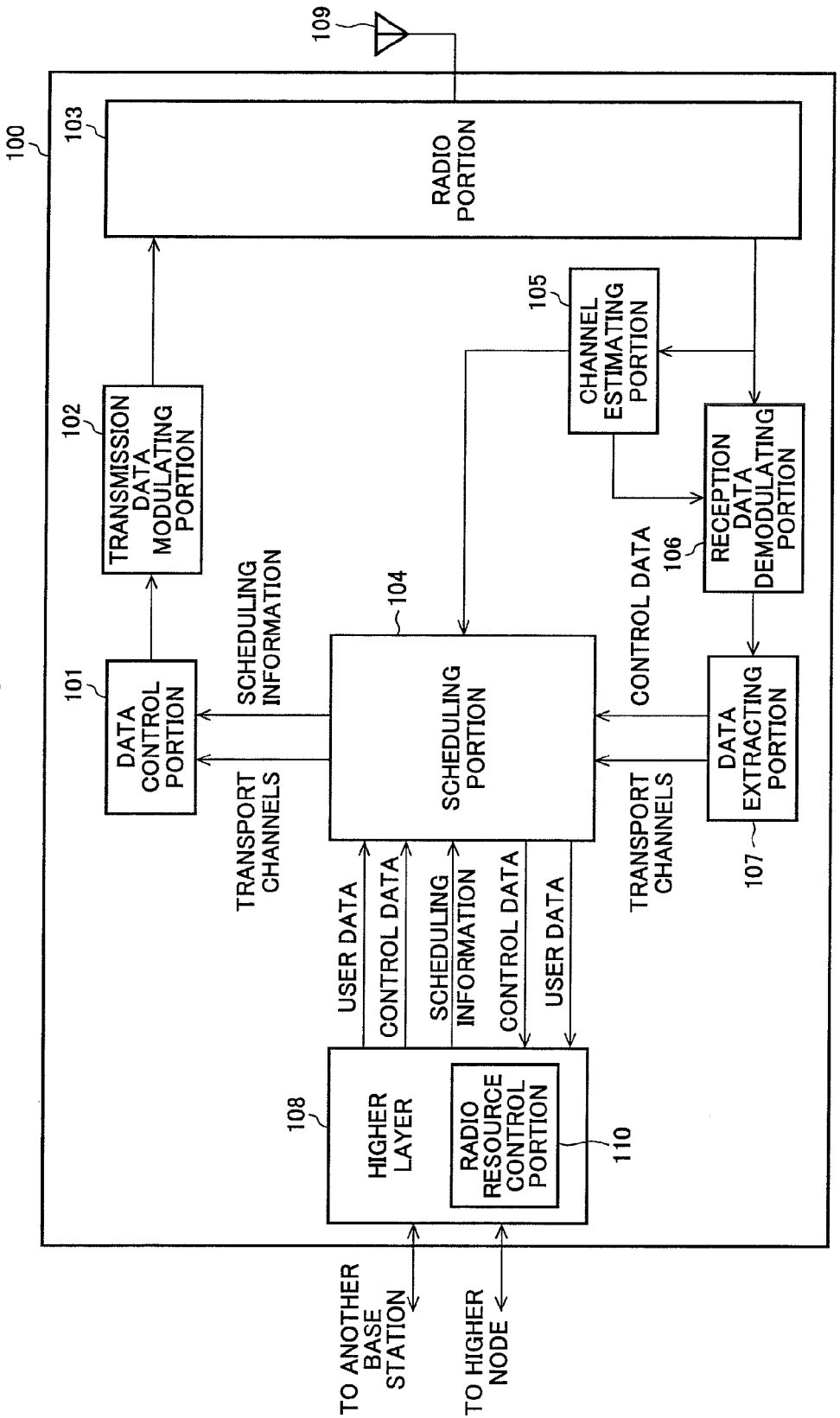
FIG. 2 is a block diagram of a general configuration of a base station apparatus 100 according to an embodiment of the present invention.

FIG. 2 is a block diagram of a general configuration of the base station apparatus 100 according to an embodiment of the present invention. The base station apparatus 100 includes a data control portion 101, a transmission data modulating portion 102, a radio portion 103, a scheduling portion 104, a channel estimating portion 105, a reception data demodulating portion 106, a data extracting portion 107, a higher layer 108, and an antenna 109. A receiving portion is made up of the radio portion 103, the scheduling portion 104, the channel estimating portion 105, the reception data demodulating portion 106, the data extracting portion 107, the higher layer 108, and the antenna 109, and a transmitting portion is made up of the data control portion 101, the transmission data modulating portion 102, the radio portion 103, the scheduling portion 104, the higher layer 108, and the antenna 109.

The antenna 109, the radio portion 103, the channel estimating portion 105, the reception data demodulating portion 106, and the data extracting portion 107 execute processes of an uplink physical layer. The antenna 109, the radio portion 103, the transmission data modulating portion 102, and the data control portion 101 execute processes of a downlink physical layer.

The data control portion 101 receives the transport channels from the scheduling portion 104. The data control portion 101 maps the transport channels as well as signals and channels generated in the physical layer to the physical channels based on the scheduling information input from the scheduling portion 104. The data mapped as described above are output to the transmission data modulating portion 102.

The transmission data modulating portion 102 modulates transmission data into the OFDM mode. The transmission data modulating portion 102 executes signal processes such as data modulation, encoding, input signal serial/parallel conversion, the IFFT (Inverse Fast Fourier Transform) process, CP (cyclic prefix) insertion, and filtering for data input from the data control portion 101 to generate and output transmission data to the radio portion 103 based on the scheduling information from the scheduling portion 104 and a modulation mode and a coding mode corresponding to PRBs. The scheduling information includes downlink physical resource block PRB allocation information, for example, physical resource block position information made up of frequency and time, and the modulating scheme and the coding scheme corresponding to PRBs include information such as a modulating scheme: 16QAM and a coding rate: ⅔ coding rate, for example.

The radio portion 103 up-converts the modulated data input from the transmission data modulating portion 102 to a radio frequency to generate and transmit a radio signal via the antenna 109 to the mobile station apparatus 200. The radio portion 103 receives an uplink radio signal from the mobile station apparatus 200 via the antenna 109 and down-converts the signal to a baseband signal to output the reception data to the channel estimating portion 105 and the reception data demodulating portion 106.

The scheduling portion 104 executes a process of a medium access control (MAC) layer. The scheduling portion 104 performs the mapping of the logical channels and the transport channels, the scheduling of downlink and uplink (such as HARQ process and selection of transport format), etc. Since the scheduling portion 104 integrally controls the processing portions of the physical layers, interfaces exist between the scheduling portion 104 and the antenna 109, the radio portion 103, the channel estimating portion 105, the reception data demodulating portion 106, the data control portion 101, the transmission data modulating portion 102, and the data extracting portion 107 (although not depicted).

In the downlink scheduling, the scheduling portion 104 executes the selection process of a downlink transport format for modulating data (transmission form, i.e., allocation of physical resource blocks and a modulating scheme and a coding scheme), the retransmission control of HARQ, and the generation of the scheduling information used in downlink, based on feedback information received from the mobile station apparatus 200 (uplink channel state information (CQI, PMI, RI) and ACK/NACK information for downlink data), the information of usable PRB of the mobile station apparatuses, a buffer status, the scheduling information input from the higher layer 108, etc. The scheduling information used for the downlink scheduling is output to the data control portion 101.

In the uplink scheduling, the scheduling portion 104 executes the selection process of an uplink transport format for modulating data (transmission form, i.e., allocation of physical resource blocks and a modulating scheme and a coding scheme) and the generation of the scheduling information used in the uplink scheduling, based on an estimation result of an uplink channel state (radio propagation channel state) output by the channel estimating portion 105, a resource allocation request from the mobile station apparatus 200, information of usable PRB of the mobile station apparatuses 200, the scheduling information input from the higher layer 108, etc. The scheduling information used for the uplink scheduling is output to the data control portion 101.

The scheduling portion 104 maps the downlink logical channels input from the higher layer 108 to the transport channels before output to the data control portion 101. The scheduling portion 104 processes the control data acquired through the uplink and the transport channels input from the data extracting portion 107 as needed and maps the control data and the transport channels to the uplink logical channels before output to the higher layer 108.

The channel estimating portion 105 estimates an uplink channel state from an uplink demodulation reference signal (DRS) for the demodulation of uplink data and outputs the estimation result to the reception data demodulating portion 106. The channel estimating portion 105 also estimates an uplink channel state from an uplink sounding reference signal (SRS) for scheduling the uplink and outputs the estimation result to the scheduling portion 104.

The reception data demodulating portion 106 also acts as an OFDM demodulating portion and/or a DFT-Spread-OFDM (DFT-S-OFDM) demodulating portion demodulating reception data modulated into the OFDM mode and/or SC-FDMA mode. Based on the uplink channel state estimation result input from the channel estimating portion 105, the reception data demodulating portion 106 executes signal processes such as DFT transform, sub-carrier mapping, IFFT transform, and filtering for the modulated data input from the radio portion 103 to execute the demodulating process before output to the data extracting portion 107.

The data extracting portion 107 confirms the correctness of the data input from the reception data demodulating portion 106 and outputs the confirmation result (acknowledgement signal ACK/negative acknowledgement signal NACK) to the scheduling portion 104. The data extracting portion 107 divides the data input from the reception data demodulating portion 106 into the transport channels and the physical layer control data before output to the scheduling portion 104. The divided control data includes the channel state information (CQI, PMI, RI) supplied from the mobile station apparatus 200, the ACK/NACK information, a scheduling request, etc.

The higher layer 108 executes processes of a packet data convergence protocol (PDCP) layer, a radio link control (RLC) layer, and a radio resource control (RRC) layer. Since the higher layer 108 integrally controls the processing portions of the lower layers, interfaces exist between the higher layer 108 and the scheduling portion 104, the antenna 109, the radio portion 103, the channel estimating portion 105, the reception data demodulating portion 106, the data control portion 101, the transmission data modulating portion 102, and the data extracting portion 107 (although not depicted).

The higher layer 108 has a radio resource control portion 110 (also referred to as a control portion). The radio resource control portion 110 performs management of various pieces of configuration information, management of system information, paging control, management of communication states of mobile station apparatuses, management of migration such as handover, management of buffer status for each mobile station apparatus, management of connection setup of unicast and multicast bearers, management of mobile station identifier (UEID), etc. The higher layer 108 gives/receives information to/from another base station apparatus and information to/from a higher node.

Configuration of Mobile Station Apparatus]

Figure 3:
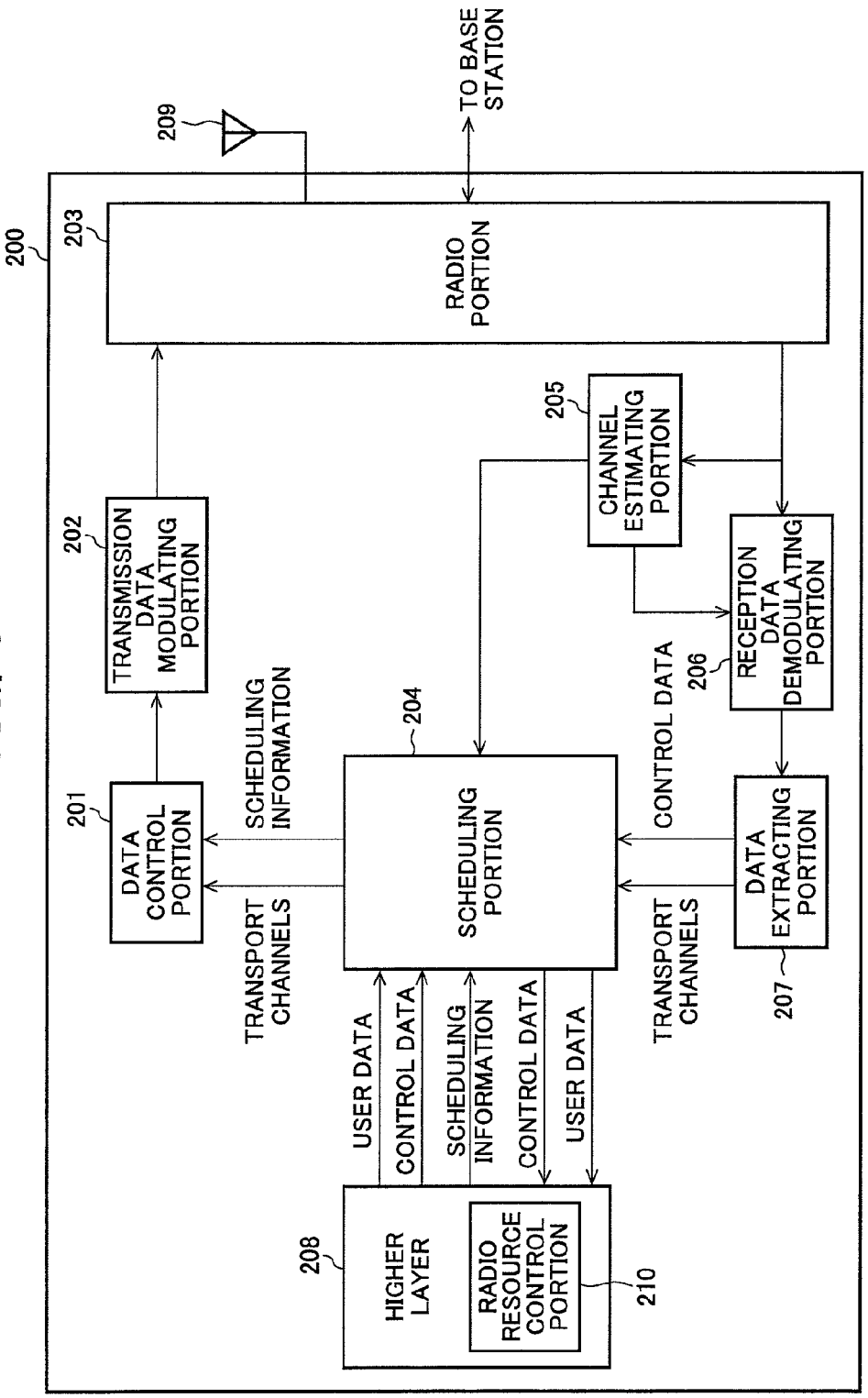
FIG. 3 is a block diagram of a general configuration of a mobile station apparatus 200 according to the embodiment of the present invention.

FIG. 3 is a block diagram of a general configuration of the mobile station apparatus 200 according to an embodiment of the present invention. The mobile station apparatus 200 includes a data control portion 201, a transmission data modulating portion 202, a radio portion 203, a scheduling portion 204, a channel estimating portion 205, a reception data demodulating portion 206, a data extracting portion 207, a higher layer 208, and an antenna 209. A transmitting portion is made up of the data control portion 201, the transmission data modulating portion 202, the radio portion 203, the scheduling portion 204, the higher layer 208, and the antenna 209, and a receiving portion is made up of the radio portion 203, the scheduling portion 204, the channel estimating portion 205, the reception data demodulating portion 206, the data extracting portion 207, the higher layer 208, and the antenna 209.

The data control portion 201, the transmission data modulating portion 202, and the radio portion 203 execute processes of the uplink physical layer. The radio portion 203, the channel estimating portion 205, the reception data demodulating portion 206, and the data extracting portion 207 execute processes of the downlink physical layer.

The data control portion 201 receives the transport channels from the scheduling portion 204. The data control portion 201 maps the transport channels as well as signals and channels generated in the physical layer to the physical channels based on the scheduling information input from the scheduling portion 204. The data mapped as described above are output to the transmission data modulating portion 202.

The transmission data modulating portion 202 modulates transmission data into the OFDM mode and/or the SC-FDMA mode. The transmission data modulating portion 202 executes signal processes such as data modulation, DFT (discrete Fourier transform) process, sub-carrier mapping, IFFT (inverse fast Fourier transform) process, CP insertion, and filtering for the data input from the data control portion 201 to generate and output transmission data to the radio portion 203.

The radio portion 203 up-converts the modulated data input from the transmission data modulating portion 202 to a radio frequency to generate and transmit a radio signal via the antenna 209 to the base station apparatus 100. The radio portion 203 receives a radio signal modulated with the downlink data from the base station apparatus 100 via the antenna 209 and down-converts the signal to a baseband signal to output the reception data to the channel estimating portion 205 and the reception data demodulating portion 206.

The scheduling portion 204 executes a process of a medium access control (MAC) layer. The scheduling portion 104 performs the mapping of the logical channels and the transport channels, the scheduling of downlink and uplink (such as HARQ process and selection of transport format), etc. Since the scheduling portion 204 integrally controls the processing portions of the physical layers, interfaces exist between the scheduling portion 204 and the antenna 209, the data control portion 201, the transmission data modulating portion 202, the channel estimating portion 205, the reception data demodulating portion 206, the data extracting portion 207, and the radio portion 203 (although not depicted).

In the down link scheduling, the scheduling portion 204 executes the reception control of the transport channels and the physical signals and physical channels, the HARQ retransmission control, and the generation of the scheduling information used in the downlink scheduling, based on the scheduling information from the base station apparatus 100 and the higher layer 208 (the transport format and the HARQ retransmission information). The scheduling information used for the downlink scheduling is output to the data control portion 201.

In the uplink scheduling, the scheduling portion 204 executes the scheduling process for mapping the uplink logical channels input from the higher layer 208 to the transport channels and the generation of the scheduling information used in the uplink scheduling, based on the uplink buffer status input from the higher layer 208, the uplink scheduling information from the base station apparatus 100 input from the data extracting portion 207 (the transport format and the HARQ retransmission information), and the scheduling information input from the higher layer 208. For the uplink transport format, the information supplied from the base station apparatus 100 is utilized. The scheduling information is output to the data control portion 201.

The scheduling portion 204 maps the uplink logical channels input from the higher layer 208 to the transport channels before output to the data control portion 201. The scheduling portion 204 also outputs to the data control portion 201 the downlink channel state information (CQI, PMI, RI) input from the channel estimating portion 205 and a confirmation result of CRC check input from the data extracting portion 207. The scheduling portion 204 processes the control data acquired through the downlink and the transport channels input from the data extracting portion 207 as needed and maps the control data and the transport channels to the downlink logical channels before output to the higher layer 208.

The channel estimating portion 205 estimates a downlink channel state from a downlink reference signal (RS) for the demodulation of downlink data and outputs the estimation result to the reception data demodulating portion 206. The channel estimating portion 205 estimates a downlink channel state from a downlink reference signal (RS) for notifying the base station apparatus 100 of an estimation result of a downlink channel state (radio propagation channel state) and converts this estimation result into the downlink channel state information (CQI, PMI, RI, etc) for the output to the scheduling portion 204.

The reception data demodulating portion 206 demodulates reception data demodulated into the OFDM mode. The reception data demodulating portion 206 executes the demodulation process for the modulated data input from the radio portion 203 based on the downlink channel state estimation result input from the channel estimating portion 205 before output to the data extracting portion 207.

The data extracting portion 207 performs the CRC check for the data input from the reception data demodulating portion 206 to confirm the correctness and outputs the confirmation result (acknowledgement ACK/negative acknowledgement NACK) to the scheduling portion 204. The data extracting portion 207 divides the data input from the reception data demodulating portion 206 into the transport channels and the physical layer control data before output to the scheduling portion 204. The divided control data includes the scheduling information such as downlink or uplink resource allocation and uplink HARQ control information.

The higher layer 208 executes processes of a packet data convergence protocol (PDCP) layer, a radio link control (RLC) layer, and a radio resource control (RRC) layer. Since the higher layer 208 integrally controls the processing portions of the lower layers, interfaces exist between the higher layer 208 and the scheduling portion 204, the antenna 209, the data control portion 201, the transmission data modulating portion 202, the channel estimating portion 205, the reception data demodulating portion 206, the data extracting portion 207, and the radio portion 203 (although not depicted).

The higher layer 208 has a radio resource control portion 210 (also referred to as a control portion). The radio resource control portion 210 performs management of various pieces of configuration information, management of system information, paging control, management of communication state of the mobile station, management of migration such as handover, management of buffer status, management of connection setup of unicast and multicast bearers, and management of mobile station identifier (UEID).

First Embodiment

A first embodiment of the mobile communication system using the base station apparatus 100 and the mobile station apparatus 200 will be described. In the first embodiment, the base station apparatus: using the plurality of PDCCHs mapped on the single downlink carrier component, allocates the plurality of PDSCHs mapped on the carrier component on which the plurality of PDCCHs are mapped or another carrier component that is different from the carrier component on which the plurality of PDCCHs are mapped; and, using the plurality of PDSCHs allocated, transmits, to the mobile station apparatus, the plurality of downlink transport blocks in one same sub frame. The mobile station apparatus: bundles, or multiplexes (using a plurality of bits) the control signal of HARQ for the plurality of PDCCHs and/or the plurality of downlink transport blocks in a single uplink carrier component that corresponds to the single downlink carrier component; and transmits, to the base station apparatus, the control signal. The base station apparatus receives, from the mobile station apparatus, the control signal of HARQ for the plurality of PDCCHs and/or the plurality of downlink transport blocks, bundled or multiplexed in the single uplink carrier component that corresponds to the single downlink carrier component on which the plurality of PDCCHs are mapped.

The "control signal (control information) of HARQ transmitted by the mobile station apparatus to the base station apparatus" is a signal (information) that indicates ACK/NACK for the PDCCH and/or the downlink transport blocks, and/or a signal (information) that indicates the DTX. The signal indicative of DTX is a signal (information) that indicates that the mobile station apparatus fails to detect the PDCCH from the base station apparatus.

Although a frequency band is defined in bandwidth (Hz) in the first embodiment, a frequency band may be defined in the number of resource blocks (RBs) constituted of frequency and time. The carrier component in this embodiment indicates a (narrower) frequency band used by the base station apparatus and the mobile station apparatus performing communication in the mobile communication system having a (wider) system band (frequency band). The base station apparatus and the mobile station apparatus aggregate the plurality of carrier components (e.g., five frequency bands each having a bandwidth of 20 MHz) (frequency band aggregation: referred to also as Spectrum aggregation, Carrier aggregation, Frequency aggregation, etc.) to constitute a (wider) system band (e.g., DL/UL system band having a bandwidth of 100 MHz) and can realize high-speed data communication (transmission/reception of information) by using the plurality of carrier components in a multiple manner.

The carrier component indicates each of (narrower) frequency bands (e.g., frequency bands each having a bandwidth of 20 MHz) constitute this (wider) system band (e.g., DL/UL system band having a bandwidth of 100 MHz). Therefore, a downlink carrier component has a bandwidth of a portion of the frequency band usable by the base station apparatus and the mobile station apparatus at the time of transmission/reception of downlink information, and an uplink carrier component has a bandwidth of a portion of the frequency band usable by the base station apparatus and the mobile station apparatus at the time of transmission/reception of uplink information. The carrier component may be defined as a constituent unit of a certain physical channel (e.g., the PDCCH, the PUCCH).

Here, the carrier components may be mapped in continuous frequency bands or may be mapped in discontinuous frequency bands so that a wider system band can be constituted by aggregating the plurality of carrier components that are continuous and/or discontinuous frequency bands. A downlink frequency band (DL system band, DL system bandwidth) and an uplink frequency band (UL system band, UL system bandwidth) constituted of the carrier components may not be of the same bandwidth. Even though the DL system band and the UL system band have different bandwidths, the base station apparatus and the mobile station apparatus can perform communication by using those frequency bands (asymmetric frequency band aggregation described above: asymmetric carrier aggregation).

Figure 4:
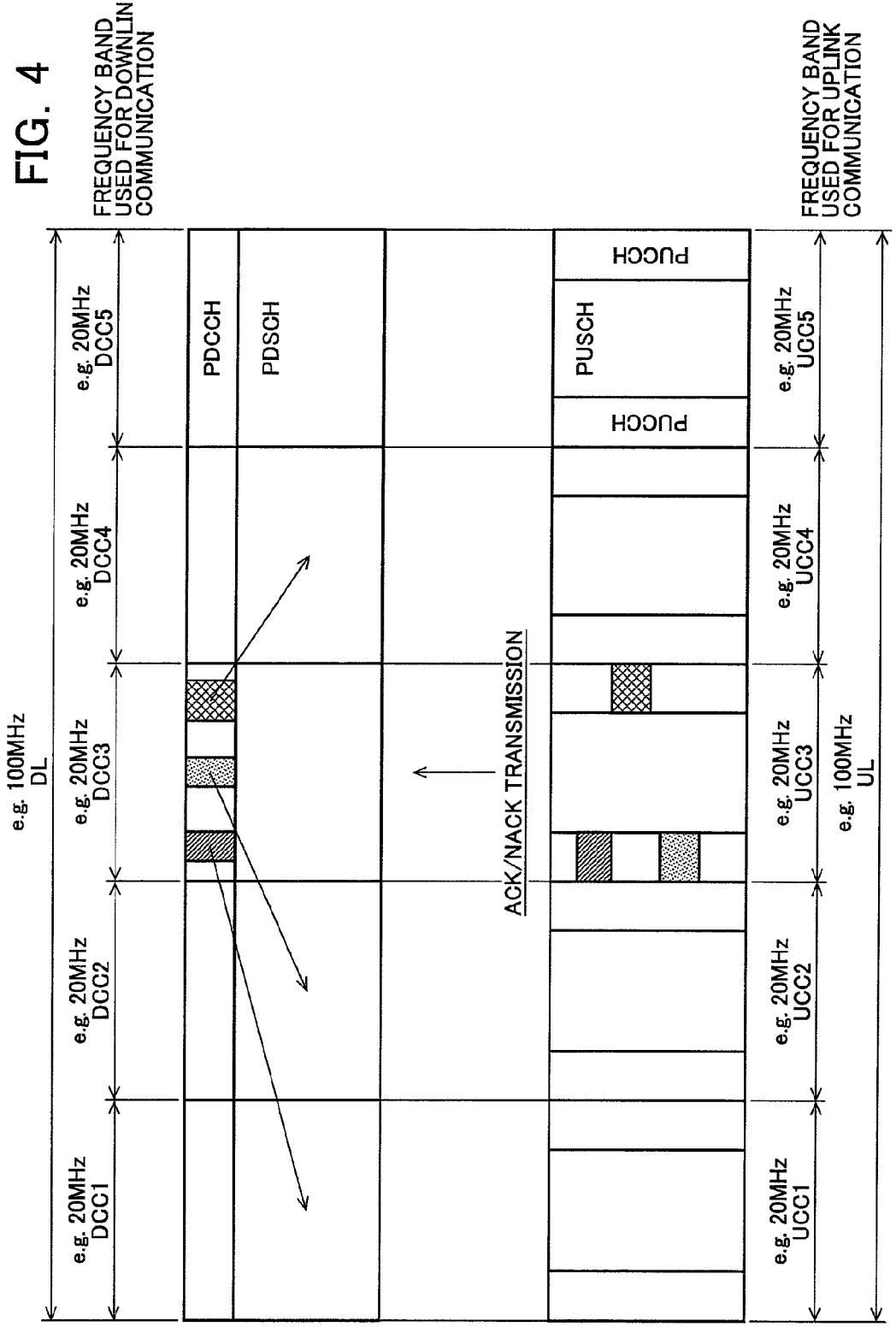
FIG. 4 is a diagram of an example of a mobile communication system to which a first embodiment is applicable.

FIG. 4 is a diagram of an example of a mobile communication system that the first embodiment is applicable with. FIG. 4 depicts the state as an example for explaining the first embodiment where a frequency band having a bandwidth of 100 MHz and used in downlink communication includes five downlink carrier components (DCC1, DCC2, DCC3, DCC4, and DCC5) each having a bandwidth of 20 MHz. FIG. 4 also depicts the state where a frequency band having a bandwidth of 100 MHz and used in uplink communication includes five uplink carrier components (UCC1, UCC2, UCC3, UCC4, and UCC5) each having a bandwidth of 20 MHz. In FIG. 4, the downlink/uplink channels are mapped on each of the downlink/uplink carrier components. In FIG. 4, there may be downlink or uplink carrier component(s) on which any one of the downlink or uplink channels such as the PDCCH, the PDSCH, the PUCCH, or the PUSCH is not mapped.

In FIG. 4, the base station apparatus is able to allocate the plurality of PDSCHs using the plurality of PDCCHs mapped on the single downlink carrier component. FIG. 4 depicts the state as an example where the base station apparatus allocates the PDSCHs mapped on DCC1, DCC2, and DCC4 using the three PDCCHs mapped on DCC3 (the PDCCHs each indicated by slant lines, grid lines, or net lines) (allocates the PDSCH mapped on DCC1 using the PDCCH indicated by the slant lines, the PDSCH mapped on DCC2 using the PDCCH indicated by the grid lines, and the PDSCH mapped on DCC4 using the PDCCH indicated by the net lines). The base station apparatus is able to transmit to the mobile station apparatus (at most up to three) downlink transport block(s) in one same sub frame using the PDSCHs mapped on DCC1, DCC2, and DCC4.

A method of explicitly allocating the plurality of PDSCHs by transmitting to the mobile station apparatus the plurality of PDCCHs including information for indicating a component carrier indicator in each of the plurality of PDCCHs or a method of implicitly allocating the plurality of PDSCHs by allocating the plurality of PDSCHs corresponding to the positions to map the plurality of PDCCHs on the single downlink carrier component is employed as the method for the base station apparatus to allocate the plurality of PDSCHs using the plurality of PDCCHs mapped on the single downlink carrier component.

According to the explicit method, the base station apparatus is able to transmit to the mobile station apparatus the plurality of PDCCHs including in each of the plurality of PDCCHs the information indicating the component carrier indicator that indicates which PDSCH is allocated by the PDCCH. For example, in FIG. 4, the base station apparatus transmits to the mobile station apparatus: the PDCCH indicated by the slant lines including in this PDCCH the information indicating the component carrier indicator that indicates that the PDSCH of DCC1 is allocated; the PDCCH indicated by the grid lines including using this PDCCH the information indicating the component carrier indicator that indicates that the PDSCH of DCC2 is allocated; and the PDCCH indicated by the net lines including using this PDCCH the information indicating the component carrier indicator that indicates that the PDSCH of DCC4 is allocated.

According to the implicit method, when the base station apparatus maps the PDCCHs on the single downlink carrier component, the base station apparatus is able to map the PDCCHs associated with the PDSCHs to be allocated by the PDCCHs and transmit the PDCCHs to the mobile station apparatus. For example, in FIG. 4, the base station apparatus maps on the single downlink carrier component the PDCCH indicated by the slant lines associated with the PDSCH of DCC1, maps on the single downlink carrier component the PDCCH indicated by the grid lines associated with the PDSCH of DCC2, and maps on the single downlink carrier component the PDCCH indicated by the net lines associated with the PDSCH of DCC4, and transmits these PDCCHs to the mobile station apparatus. For example, the mobile station apparatus is able to associate the order of detecting the PDCCHs mapped on the single downlink carrier component with the PDSCHs to be allocated by the PDCCHs, and the PDSCH of DCC1 is allocated by the PDCCH first detected; the PDSCH of DCC2 is allocated by the PDCCH detected next thereby the PDSCH of DCC3 is allocated by the PDCCH detected next thereby the PDSCH of DCC4 is allocated by the PDCCH detected next thereby and the PDSCH of DCC5 is allocated by the PDCCH detected next thereby.

The mobile station apparatus is able to bundle or multiplex the control signal of HARQ for the plurality of PDCCHs and/or the plurality of downlink transport blocks from the base station apparatus, in the single uplink carrier component that corresponds to the single downlink carrier component on which the plurality of PDCCHs are mapped, and transmit the control signal to the base station apparatus. FIG. 4 depicts the state as an example where the mobile station apparatus bundles or multiplexes in UCC3 corresponding to DCC3 the control signal of HARQ for the plurality of PDCCHs transmitted using DCC3 and/or the downlink transport blocks transmitted using the PDSCHs of DCC1, DCC2, and DCC4; and transmits the control signal to the base station apparatus using the PUCCH of UCC3.

The expression "the mobile station apparatus bundles the control signal of HARQ and transmits the control signal to the base station apparatus" used herein refers to the operation that the mobile station apparatus calculates (generates) one control signal (control information) of HARQ from a control signal (control information) of HARQ for each of the plurality of PDCCHs and/or the plurality of downlink transport blocks, and transmits to the base station apparatus one control signal (control information) of HARQ calculated. For example, the mobile station apparatus calculates a logical sum of control signals each indicating ACK/NACK of HARQ (control signal of HARQ) for each of the plurality of downlink transport blocks and, thereby, is able to transmit to the base station apparatus the logical sum as one control signal indicating ACK/NACK (the control signal of HARQ). In FIG. 4, the mobile station apparatus: calculates the logical sum of the control signals each indicating ACK/NACK of HARQ (the control signal of HARQ) for each of the downlink transport blocks transmitted from the base station apparatus in one same sub frame using the PDSCHs of DCC1, DCC2, and DCC4; and transmits to the base station apparatus the logical sum as the one control signal indicating ACK/NACK (the control signal of HARQ).

The expression "the mobile station apparatus multiplexes the control signal of HARQ and transmits the control signal to the base station apparatus" used herein refers to the operation that the mobile station apparatus: uses and expresses the plurality of control signals (the pieces of control information) that are less than the signals (pieces of information) necessary for expressing all combinations from the control signal (control information) of HARQ for each of the plurality of PDCCHs and/or the plurality of downlink transport blocks; and transmits the control signal to the base station apparatus. For example, the mobile station apparatus is able to express using a plurality of bits the control signal indicating ACK/NACK of HARQ (the control signal of HARQ) for each of the plurality of downlink transport blocks; and transmit the control signal to the base station apparatus. In FIG. 4, the mobile station apparatus expresses using the plurality of bits the control signal indicating ACK/NACK of HARQ (the control signal of HARQ) for each of the downlink transport blocks transmitted from the base station apparatus in the same sub frame using the PDSCHs of DCC1, DCC2, and DCC4; and transmits the control signal to the base station apparatus.

In this case, the mobile station apparatus executes the bundling or the multiplexing of the control signal of HARQ, in the single uplink carrier component that corresponds to the single downlink carrier component on which the plurality of PDCCHs are mapped. FIG. 4 depicts the state where the mobile station apparatus executes the bundling or the multiplexing of the control signal of HARQ, in UCC3 that corresponds to DCC3 on which the plurality of PDCCHs are mapped.

The base station apparatus is able to set specifically to the cell the correspondence between the single downlink carrier component on which the plurality of PDCCHs are mapped and the single uplink carrier component, by broadcast information broadcasted on each of the downlink carrier components (using the physical broadcast channel). The base station apparatus is able to set specifically to the mobile station apparatus the correspondence between the single downlink carrier component on which the plurality of PDCCHs are mapped and the single uplink carrier component, by a radio resource control signal transmitted for each mobile station apparatus (hereinafter, referred to as "RRC signaling"). The base station apparatus is able to set specifically to the cell or specifically to the mobile station apparatus the single downlink carrier component on which the plurality of PDCCHs are mapped, by using the physical broadcast channel or the RRC signaling. The base station apparatus is further able to set in the mobile station apparatus specifically to the cell or specifically to the mobile station apparatus the single uplink carrier component for the mobile station apparatus to transmit the control signal of HARQ, by using the physical broadcast channel or the RRC signaling.

The base station apparatus is able to indicate the resources of the PUCCH (a PUCCH resource area) for the mobile station apparatus to transmit the control signal of HARQ, by the broadcast information broadcasted on each of the downlink carrier components (using the physical broadcast channel). The base station apparatus is able to indicate the resources of the PUCCH (the PUCCH resource area) for the mobile station apparatus to transmit the control signal of HARQ by the RRC signaling transmitted to each of the mobile station apparatuses.

The base station apparatus is able to designate in which area of the PUCCH resource area the mobile station apparatus maps the control signal of HARQ and transmits the control signal (which area in the PUCCH resource area the mobile station apparatus uses to transmit the control signal of HARQ) based on the position of the PDCCH mapped on the single downlink carrier component in the PDCCH resource (the PDCCH resource area). The mobile station apparatus is able to transmit to the base station apparatus the control signal of HARQ mapped on the PUCCH in the PUCCH resource area set based on the physical broadcast channel or the RRC signaling, corresponding to how the plurality of PDCCHs mapped on the single downlink carrier component are set in the PDCCH resource (the PDCCH resource area). In this case, the correspondence between the plurality of PDCCHs mapped on the single downlink carrier component and each of the PUCCHs is specified by, for example, making the first CCE index of the CCE constituting each of the PDCCHs and the index of each of the PUCCHs correspond.

FIG. 4 depicts the state where the base station apparatus makes the single downlink carrier component (DCC3) on which the plurality of PDCCHs are mapped and the single uplink carrier component (UCC3) correspond, using the physical broadcast channel or the RRC signaling. FIG. 4 also depicts the state where the base station apparatus designates the PUCCH resource (the PUCCH resource area) of UCC3 for the mobile station apparatus to transmit the control signal of HARQ, using the physical broadcast channel or the RRC signaling. FIG. 4 further depicts the state where the mobile station apparatus transmits to the base station apparatus the control signal of HARQ mapped on the PUCCHs (the PUCCHs indicated by slant lines, grid lines, and net lines) in the PUCCH resource area, corresponding to the positions in the PDCCH resource area of the plurality of PDCCHs (the PDCCHs indicated by the slant lines, the grid lines, and the net lines) mapped on DCC3 (in FIG. 4, as an example, the first CCE index of the CCE constituting the PDCCH indicated by the slant lines corresponds to the index of the PUCCH indicated by the slant lines, the first CCE index of the CCE constituting the PDCCH indicated by the grid lines corresponds to the index of the PUCCH indicated by the grid lines, and the first CCE index of the CCE constituting the PDCCH indicated by the net lines corresponds to the index of the PUCCH indicated by the net lines).

When the mobile station apparatus bundles the control signal of HARQ and transmits the bundled control signal to the base station apparatus, the mobile station apparatus transmits the bundled control signal to the base station apparatus as one-bit information, for example, (for example, information indicating ACK or NACK) using any one PUCCH of the plurality of PUCCHs designated by the plurality of PDCCHs mapped on the single downlink carrier component (the positions of the plurality of PDCCHs in the PDCCH resource area) (Two-bit information is transmitted for MIMO transmission). In this case, the mobile station apparatus is able to transmit the bundled control signal to the base station apparatus further including several-bit information in the bundled control signal base on which PUCCH's area is used in the areas that are available for mapping the PUCCH designated corresponding to the positions of the plurality of PDCCHs and the number of PDCCHs detected. For example, in FIG. 4, the mobile station apparatus uses areas of the three PUCCHs that correspond to the three PDCCHs mapped on the single downlink carrier component (DCC3) and executes selection of the areas of the three PUCCHs and, thereby, is able to transmit to the base station apparatus a total of six kinds of information. As depicted in FIG. 4, the three PUCCHs corresponding to the three PDCCHs mapped on the single uplink carrier component (UCC3) and the mobile station apparatus is able to transmit to the base station apparatus the total of six kinds of information using the single uplink carrier component (UCC3) that corresponds to the single downlink carrier component (DCC3).

As above, the mobile station apparatus bundles the control signal of HARQ and transmits the bundled control signal to the base station apparatus using any one PUCCH of the plurality of PUCCHs that correspond to the plurality of PDCCHs. In this case, the mobile station apparatus is able to transmit to the base station apparatus the bundled control signal of HARQ using the PUCCH that corresponds to a specific PDCCH of the plurality of PDCCHs mapped on the single downlink carrier component. The mobile station apparatus transmits the bundled control signal of HARQ using the PUCCH that corresponds to the specific PDCCH and, thereby, the base station apparatus is able to detect up to which PDCCH the mobile station apparatus is successfully receives (detects) from the plurality of PDCCHs mapped on the single downlink carrier component, based on the PUCCH on which the control signal of HARQ is mapped (the PUCCH on which the control signal of HARQ is mapped by the mobile station apparatus).

For example, the mobile station apparatus transmits to the base station apparatus the control signal of HARQ using the PUCCH that corresponds to the PDCCH finally detected of the plurality of PDCCHs, and thereby the base station apparatus is able to detect up to which PDCCH the mobile station apparatus is successfully receives (detects) based on the PUCCHs on which the control signal of HARQ is mapped. In this case, the order for the mobile station apparatus to search the plurality of PDCCHs is specified.

For example, in FIG. 4, the mobile station apparatus is able to detect the plurality of PDCCHs (the PDCCHs indicated by the slant lines, the grid lines, and the net lines) mapped on the single downlink carrier component (DCC3) in the direction for the CCE index to be increased, and transmit to the base station apparatus the bundled control signal of HARQ using the PUCCH that corresponds to the PDCCH finally detected. The mobile station apparatus detects the PDCCHs in order of the PDCCH indicated by the slant lines, the PDCCH indicated by the grid lines and the PDCCH indicated by the net lines as the direction for the CCE index to be increased, and transmits to the base station apparatus the bundled control signal of HARQ using the PUCCH indicated by the net lines that corresponds to the PDCCH indicated by the net lines finally detected. Thereby, the base station apparatus is able to detect that the mobile station apparatus successfully receives (detects) up to the PDCCH indicated by the net lines (The base station apparatus is able to detect that the mobile station apparatus is successfully receives (detects) up to the PDCCH indicated by the net lines based on the fact that the mobile station apparatus transmits the control signal of HARQ using the PUCCH indicated by the net lines).

According to another method, the mobile station apparatus transmits to the base station apparatus the control signal of HARQ using the PUCCH that corresponds to a specific CCE index of the plurality of PDCCHs detected on the single downlink carrier component and, thereby, the base station apparatus is able to detect up to which PDCCH the mobile station apparatus successfully receives (detects) based on the PUCCH on which the control signal of HARQ is mapped (the PUCCH on which the control signal of HARQ is mapped by the mobile station apparatus).

For example, in FIG. 4, the mobile station apparatus detects in arbitrary order the plurality of PDCCHs (the PDCCHs indicated by the slant lines, grid lines, and the net lines) mapped on the single downlink carrier component (DCC3), and transmits to the base station apparatus the bundled control signal of HARQ using the PUCCH that corresponds to the PDCCH having the largest (or the smallest) CCE index of the CCEs constituting the PDCCH detected.

The mobile station apparatus detects in arbitrary order the PDCCH indicated by the slant lines, the PDCCH indicated by the grid lines, and the PDCCH indicated by the net lines. When the CCE index constituting the PDCCH indicated by the net lines is the largest (or the smallest), the mobile station apparatus transmits to the base station apparatus the control signal of HARQ using the PUCCH indicated by the net lines. The base station apparatus is able to detect that the mobile station apparatus successfully receives (detects) up to the PDCCH indicated by the net lines, based on the fact that the mobile station apparatus transmits the control signal of HARQ using the PUCCH indicated by the net lines.

According to a yet another method, the mobile station apparatus transmits to the base station apparatus the control signal of HARQ using a specific PUCCH of the plurality of PUCCHs, that correspond to the plurality of PDCCHs, mapped on the single uplink carrier component, and thereby the base station apparatus is able to detect up to which PDCCH the mobile station apparatus successfully receives (detects).

For example, in FIG. 4, the mobile station apparatus transmits to the base station apparatus the control signal of HARQ using the PUCCH indicated by the net lines whose index is the largest (or the smallest) of the plurality of PUCCHs (the PUCCHs indicated by the slant lines, the grid lines, and the net lines) mapped on the single uplink carrier component. The base station apparatus is able to detect that the mobile station apparatus successfully receives (detects) up to the PDCCH indicated by the net lines based on the fact that the mobile station apparatus transmits the control signal of HARQ using the PUCCH indicated by the net lines.

The mobile station apparatus transmits the bundled control signal of HARQ as above, and thereby the base station apparatus and the mobile station apparatus are able to transmit and receive the control signal of HARQ and/or such signal (pieces of information) each indicating up to which PDCCH the mobile station apparatus successfully receives (detects), for example, such a signal as (ACK: PDCCHs up to the PDCCH indicated by the slant lines are received), (NACK: PDCCHs up to the PDCCH indicated by the slant lines are received), (ACK: PDCCHs up to the PDCCH indicated by the grid lines are received), (NACK: PDCCHs up to the PDCCH indicated by the grid lines are received), (ACK: PDCCHs up to the PDCCH indicated by the net lines are received), and (NACK: PDCCHs up to the PDCCH indicated by the net lines are received). In this case, when the mobile station apparatus detects the DTX for at least one PDCCH of the plurality of PDCCHs, the mobile station apparatus is able to transmit a signal indicating NACK to the base station apparatus.

When the mobile station apparatus multiplexes the control signal of HARQ and transmits the control signal multiplexed to the base station apparatus, the mobile station apparatus is able to transmit to the base station apparatus, for example, one-bit or two-bit information using one PUCCH according to a format set in advance. In this case, the mobile station apparatus is able to transmit the control signal multiplexed to the base station apparatus including further several-bit information in the control signal multiplexed depending on which PUCCH's area is used of the areas available for mapping the PUCCHs designated corresponding to the positions of the plurality of PDCCHs detected and the number of the PDCCHs. For example, in FIG. 4, when the mobile station apparatus is able to transmit two-bit information using each of the three PUCCHs that correspond to the three PDCCHs mapped on the single downlink carrier component (DCC3), the mobile station apparatus is able to transmit to the base station apparatus a total of 12 kinds of information by further selecting those three PUCCHs. In this case, as depicted in FIG. 4, the three PUCCHs corresponding to the three PDCCHs are mapped on the single uplink carrier component (UCC3) and the mobile station apparatus is able to transmit to the base station apparatus a total of 12 kinds of information using the single uplink carrier component (UCC3) that corresponds to the single downlink carrier component (DCC3).

The mobile station apparatus transmits as above the multiplexed control signal of HARQ, and thereby the base station apparatus and the mobile station apparatus are able to transmit and receive such signal (pieces of information) mapped in advance as the control signal of HARQ as, for example, (ACK, ACK, ACK), (ACK, ACK, NACK), (ACK, ACK, DTX), (ACK, NACK, ACK), (ACK, NACK, NACK), (ACK, NACK, DTX), (NACK, NACK, ACK), (NACK, NACK, NACK), (NACK, NACK, DTX), (ACK, DTX, ACK), (ACK, DTX, NACK), and (ACK, DTX, DTX). In this case, when the combinations of ACK, NACK, and/or DTX are larger than the amount of information transmittable using the plurality of PUCCHs (for example, when the amount of information transmittable using the plurality of PUCCHs is 12 kinds while the amount of information is 27 kinds acquired by combining ACK, NACK, and/or DTX), the mobile station apparatus is able to transmit combinations of NACK and DTX. (For example, the base station apparatus and the mobile station apparatus are able to transmit and receive signal such as (ACK, ACK, NACK/DTX)).

Figure 5:
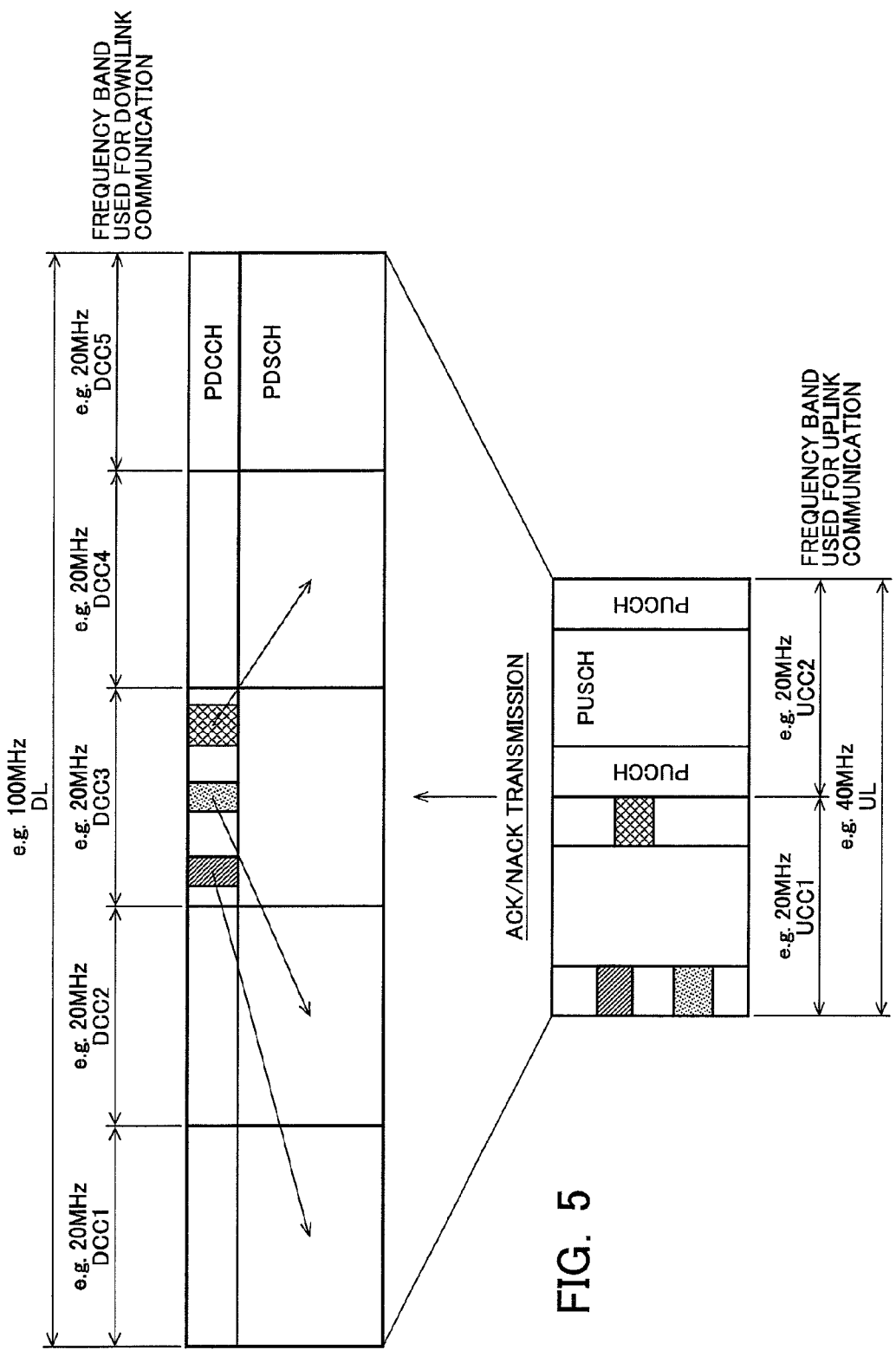
FIG. 5 is another diagram of an example of a mobile communication system to which the first embodiment is applicable.

FIG. 5 is a diagram of another example of the mobile communication system that the first embodiment is applicable to. FIG. 5 depicts the state as an example for explaining the first embodiment where a frequency band having a bandwidth of 100 MHz and used in the downlink communication includes five downlink carrier components (DCC1, DCC2, DCC3, DCC4, and DCC5) each having a bandwidth of 20 MHz. FIG. 5 also depicts the state where a frequency band having a bandwidth of 40 MHz and used in the uplink communication includes two uplink carrier components (UCC1 and UCC2) each having a bandwidth of 20 MHz. In FIG. 5, the downlink/uplink channels are mapped on each of the downlink/uplink carrier components. In FIG. 5, there may be downlink/uplink carrier component(s) on which any one of downlink/uplink channels such as the PDCCH, the PDSCH, the PUCCH, and the PUSCH is not mapped.

In FIG. 5, the base station apparatus is able to allocate the plurality of PDSCHs using the plurality of PDCCHs mapped on the single downlink carrier component. FIG. 5 depicts the state as an example where the base station apparatus allocates the PDSCHs mapped on DCC1, DCC2, and DCC4 using the three PDCCHs (the PDCCHs indicated by the slant lines, the grid lines, and the net lines) mapped on DCC3. The base station apparatus is able to transmit to the mobile station apparatus (up to three) downlink transport block(s) in one same sub frame using the PDSCHs mapped on DCC1, DCC2, and DCC4. The explicit allocation method or the implicit allocation method as above may be used as the method for the base station apparatus to allocate the plurality of PDSCHs using the plurality of PDCCHs mapped on the single downlink carrier component.

The mobile station apparatus is able to bundle or multiplex the control signal of HARQ for the plurality of PDCCHs and/or the plurality of downlink transport blocks, in the single uplink carrier component that corresponds to the single downlink carrier component on which the plurality of PDCCHs are mapped, and transmit the control signal bundled or multiplexed to the base station apparatus. The above method may be used as the method for the mobile station apparatus to bundle or multiplex the control signal of HARQ and transmit the bundled or multiplexed control signal to the base station apparatus. FIG. 5 depicts the state as an example where the mobile station apparatus bundles or multiplexes the control signal of HARQ for the plurality of PDCCHs transmitted using DCC3 and/or the downlink transport blocks transmitted using the PDSCHs of DCC1, DCC2, and DCC4, in UCC1 that corresponds to DCC3, and transmits the control signal bundled or multiplexed to the base station apparatus.

As above, the base station apparatus is able to set specifically to the cell or specifically to the mobile station apparatus the correspondence between the single downlink carrier component on which the plurality of PDCCHs are mapped and the single uplink carrier component, using the physical broadcast channel or the RRC signaling. FIG. 5 depicts the state where the base station apparatus sets for the mobile station apparatus the correspondence between DCC3 and UCC1 using the physical broadcast channel or the RRC signaling. The base station apparatus is able to set specifically to the cell or specifically to the mobile station apparatus the single downlink carrier component on which the plurality of PDCCHs are mapped, using the physical broadcast channel or the RRC signaling. The base station apparatus is further able to set specifically to the cell or specifically to the mobile station apparatus the single uplink carrier component for the mobile station apparatus to transmit the control signal of HARQ, using the physical broadcast channel or the RRC signaling.

As above, in the first embodiment, the base station apparatus allocates the plurality of PDSCHs using the plurality of PDCCHs mapped on the single downlink carrier component, and transmits to the mobile station apparatus the plurality of downlink transport blocks in one same sub frame using the plurality of PDSCHs allocated. The mobile station apparatus bundles or multiplexes the control signal of HARQ for the plurality of PDCCHs and/or the plurality of downlink transport blocks in the single uplink carrier component that corresponds to the single downlink carrier component on which the plurality of PDCCHs are mapped, and transmits the control signal bundled or multiplexed to the base station apparatus. The base station apparatus receives from the mobile station apparatus the control signal of HARQ bundled or multiplexed in the single uplink carrier component that corresponds to the single downlink carrier component on which the plurality of PDCCHs are mapped.

The base station apparatus and the mobile station apparatus transmit and receive the control signal of HARQ in this manner, and thereby the mobile station apparatus is able to transmit the control signal of HARQ on the single uplink carrier component that corresponds to the single downlink carrier component on which the plurality of PDCCHs are mapped and, thereby, the transmission power for transmission of the control signal of HARQ is able to be suppressed to a small value. The base station apparatus is able to designate the resources of the PUCCH for the mobile station apparatus to map the control signal of HARQ based on the position in the PDCCH resource area of each of the plurality of PDCCHs mapped on the single downlink carrier component, and thereby efficient allocation is enabled. When the mobile station apparatus bundles the control signal of HARQ and transmits the control signal bundled to the base station apparatus, the mobile station apparatus transmits the control signal of HARQ to the base station apparatus using the specific PUCCH, and thereby the base station apparatus is able to detect up to which PDCCH the mobile station apparatus successfully receives (detects).

Second Embodiment

A second embodiment of the present invention will be described. In the second embodiment, the base station apparatus allocates the PDSCHs mapped on the carrier component on which the plurality of PDCCHs are mapped or another carrier component different from the carrier component on which the plurality of PDCCHs are mapped, using the plurality of physical downlink control channels mapped on the single or the plurality of downlink carrier component(s) and transmits to the mobile station apparatus the plurality of downlink transport blocks in one same sub frame using the plurality of PDSCHs allocated. The mobile station apparatus bundles or multiplexes for each downlink carrier component on which the plurality of PDCCHs are mapped, the control signal of HARQ for the plurality of physical downlink control channels and/or the plurality of downlink transport blocks and transmits the control signal bundled or multiplexed to the base station apparatus. The base station apparatus receives from the mobile station apparatus the control signal of HARQ bundled or multiplexed for each downlink carrier component on which the plurality of PDCCHs are mapped.

The "control signal (control information) of HARQ transmitted by the mobile station apparatus to the base station apparatus" used herein refers to a signal (information) indicating ACK/NACK and/or a signal (information) indicating DTX for the PDCCH and/or the downlink transport block. The signal indicative of "DTX" refers to a signal (information) that indicates that the mobile station apparatus fails to detect the PDCCH from the base station apparatus. The same method as any of those described in the first embodiment is usable as the method for the mobile station apparatus to bundle or multiplex the control signal of HARQ and transmit the control signal bundled or multiplexed to the base station apparatus.

Figure 6:
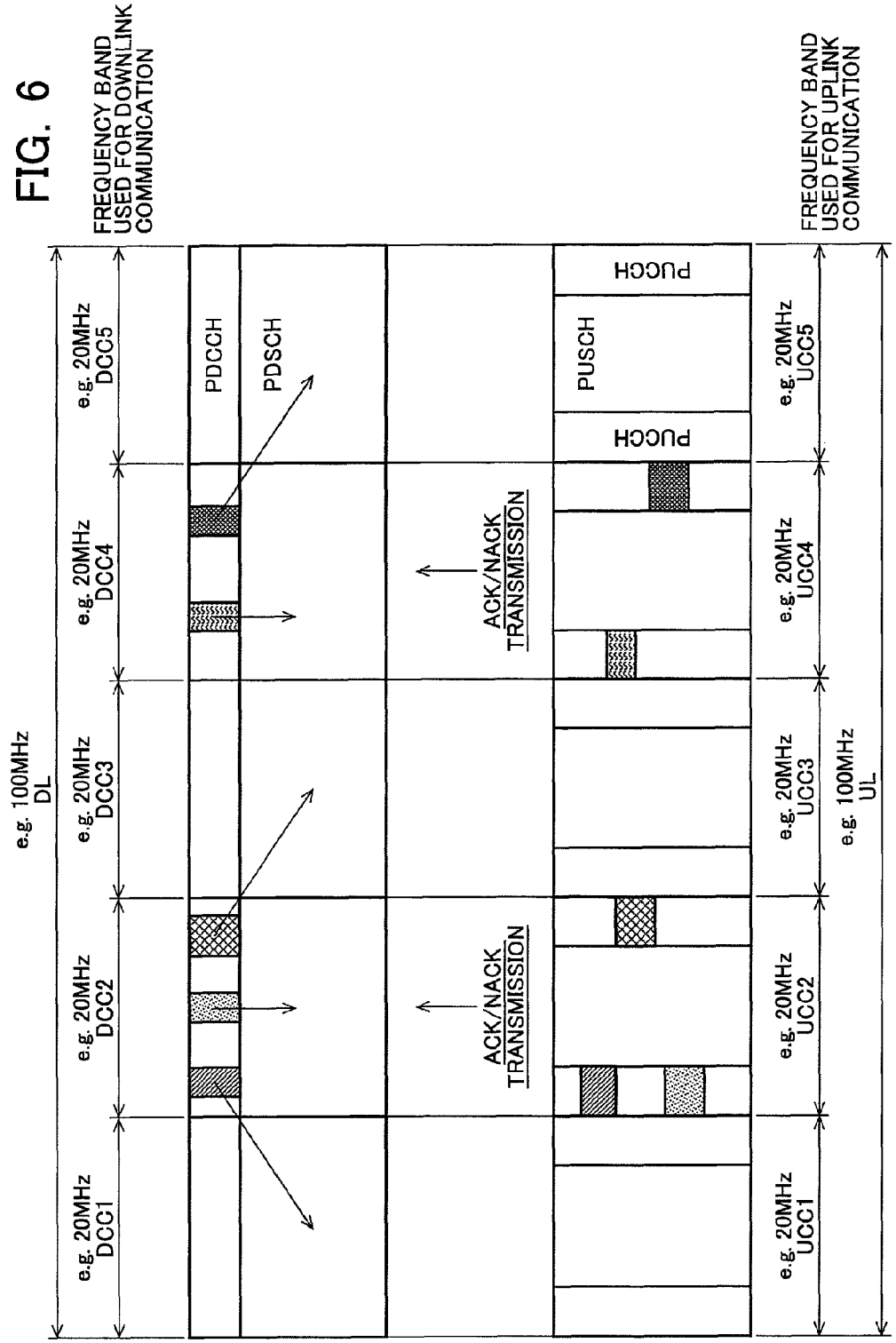
FIG. 6 is a diagram of an example of a mobile communication system to which a second embodiment is applicable.

FIG. 6 is a diagram of an example of a mobile communication system that the second embodiment is applicable to. FIG. 6 depicts the case as an example for explaining the second embodiment where a frequency band having a bandwidth of 100 MHz and used in the downlink communication includes five downlink carrier components (DCC1, DCC2, DCC3, DCC4, and DCC5) each having a bandwidth of 20 MHz. FIG. 6 also depicts the state where a frequency band having a bandwidth of 100 MHz and used in the uplink communication includes five uplink carrier components (UCC1, UCC2, UCC3, UCC4, and UCC5) each having a bandwidth of 20 MHz. In FIG. 6, the downlink/uplink channels are mapped on each of the downlink/uplink carrier components. In FIG. 6, there may be downlink/uplink carrier component(s) on which any one of downlink/uplink channels such as the PDCCH, the PDSCH, the PUCCH, and the PUSCH is not mapped.

In FIG. 6, the base station apparatus is able to allocate the plurality of PDSCHs using the plurality of PDCCHs mapped on the single or the plurality of downlink carrier component(s). FIG. 6 depicts the state as an example where base station apparatus allocates the PDSCHs mapped on DCC1, DCC2, and DCC3 using the three PDCCHs mapped on DCC2 (the PDCCHs each indicated by slant lines, grid lines, or net lines) (allocates the PDSCH mapped on DCC1 using the PDCCH indicated by the slant lines, the PDSCH mapped on DCC2 using the PDCCH indicated by the grid lines, and the PDSCH mapped on DCC3 using the PDCCH indicated by the net lines). FIG. 6 also depicts the state where the base station apparatus allocates the PDSCHs mapped on DCC4 and DCC5 using the two PDCCHs mapped on DCC4 (the PDCCHs indicated by the horizontal lines and a dotted pattern) (allocates the PDSCH mapped on DCC4 using the PDCCH indicated by the horizontal lines and the PDSCH mapped on DCC5 using the PDCCH indicated by the dotted pattern). The base station apparatus is able to transmit to the mobile station apparatus (at most five) downlink transport block(s) in one same sub frame using the PDSCHs mapped on DCC1, DCC2, DCC3, DCC4, and DCC5. The explicit allocation method or the implicit allocation method as described in the first embodiment may be used as the method for the base station apparatus to allocate the plurality of PDSCHs using the plurality of PDCCHs mapped on the single or the plurality of downlink carrier components.

The mobile station apparatus is able to bundle or multiplex for each of the downlink carrier components on which the plurality of PDCCHs are mapped, the control signal of HARQ for the plurality of PDCCHs and/or the plurality of downlink transport blocks; and transmit the control signal bundled or multiplexed to the base station apparatus. FIG. 6 depicts the state as an example where the mobile station apparatus bundles or multiplexes in UCC2 that corresponds to DCC2 the control signal of HARQ for the plurality of PDCCHs transmitted using DCC2 and/or the downlink transport blocks transmitted using the PDSCHs of DCC1, DCC2, and DCC3, and transmits the control signal bundled or multiplexed to the base station apparatus using the PUCCH of UCC2. FIG. 6 also depicts the state where the mobile station apparatus bundles or multiplexes in UCC4 that corresponds to DCC4 the control signal of HARQ for the plurality of PDCCHs transmitted using DCC4 and/or the downlink transport blocks transmitted using the PDSCHs of DCC4 and DCC5, and transmits the control signal bundled or multiplexed to the base station apparatus using the PUCCH of UCC4. In this case, the transmission of the control signal of HARQ bundled or multiplexed in UCC2, and the transmission of the control signal of HARQ bundled or multiplexed in UCC4 are executed in the same one sub frame.

For example, in FIG. 6, the mobile station apparatus is able to calculate a logical sum from the control signals each indicating ACK/NACK of HARQ (the control signal of HARQ) for each of the downlink transport blocks transmitted from the base station apparatus using the PDSCHs of DCC1, DCC2, and DCC3; calculate a logical sum from the control signals each indicating ACK/NACK of HARQ (the control signal of HARQ) for each of the downlink transport blocks transmitted using the PDSCHs of DCC4 and DCC5 and transmit each of the control signals calculated each indicating ACK/NACK (the control signal of HARQ) to the base station apparatus in one same sub frame using the PUCCHs of DCC2 and UCC4.

For example, the mobile station apparatus is able to express using a plurality of bits the control signals each indicating ACK/NACK of HARQ (the control signal of HARQ) for each of the downlink transport blocks transmitted from the base station apparatus using the PDSCHs of DCC1, DCC2, and DCC3 express using the plurality of bits the control signals each indicating ACK/NACK of HARQ (the control signal of HARQ) for each of the downlink transport blocks transmitted using the PDSCHs of DCC4 and DCC5 and transmit each of the control signals (the control signal of HARQ) to the base station apparatus in one same sub frame using the PUCCHs of DCC2 and UCC4.

The base station apparatus is able to set specifically to the cell or specifically to the mobile station apparatus the correspondence between the single or the plurality of downlink carrier component(s) on which the plurality of PDCCHs are mapped and the single or the plurality of uplink carrier component(s), using the physical broadcast channel or the RRC signaling. FIG. 6 depicts the state where the base station apparatus sets for the mobile station apparatus the correspondence between DCC2 and UCC2 and the correspondence between DCC4 and UCC4 using the physical broadcast channel or the RRC signaling. The base station apparatus is able to set specifically to the cell or specifically to the mobile station apparatus the single or the plurality of downlink carrier component(s) on which the plurality of PDCCHs are mapped, using the physical broadcast channel or the RRC signaling. The base station apparatus is further able to set specifically to the cell or specifically to the mobile station apparatus the single or the plurality of uplink carrier component(s) for the mobile station apparatus to transmit the control signal of HARQ, using the physical broadcast channel or the RRC signaling.

Thereby, the base station apparatus is able to change the (number of) downlink carrier components on which the plurality of PDCCHs are mapped, according to the state in the cell managed by the base station apparatus and the state of each mobile station apparatus and execute more flexibly considered control of the transmission power used by the mobile station apparatus to transmit the control signal of HARQ to the base station apparatus. For example, the base station apparatus allocates the plurality of PDSCHs by mapping the plurality of PDCCHs on the plurality of downlink carrier components to a mobile station apparatus having extra transmission power. The mobile station apparatus having extra transmission power bundles or multiplexes the control signal of HARQ for each of the downlink carrier components on which the plurality of PDCCHs are mapped, and transmits the control signal bundled or multiplexed to the base station apparatus (transmits to the base station apparatus information indicating ACK/NACK of HARQ using the plurality of uplink carrier components that correspond to the plurality of downlink carrier components). On the other hand, the base station apparatus allocates the plurality of PDSCHs by mapping the plurality of PDCCHs on the single downlink carrier component to a mobile station apparatus having no extra transmission power. The mobile station apparatus having no extra transmission power transmits the control signal of HARQ using the single uplink carrier component that corresponds to the single downlink carrier component. In this manner, the base station apparatus changes the (number of) downlink carrier components on which the plurality of PDCCHs are mapped, according to the state in the cell managed by the base station apparatus and the state of each mobile station apparatus, and the base station apparatus controls the (number of) uplink carrier components for the mobile station apparatus to transmit the control signal of HARQ. Thereby, more flexible transmission control is enabled.

When the mobile station apparatus bundles the control signal of HARQ and transmits the control signal bundled to the base station apparatus, the mobile station apparatus transmits the control signal bundled to the base station apparatus using any one PUCCH of the plurality of PUCCHs that correspond to the plurality of PDCCHs. In this case, similarly to the transmission methods described in the first embodiment, the mobile station apparatus is able to transmit the control signal of HARQ bundled to the base station apparatus using the PUCCH that corresponds to the specific PDCCH of the plurality of PDCCHs mapped on the single downlink carrier component or each of the plurality of downlink carrier components. The mobile station apparatus may transmit to the base station apparatus the control signal of HARQ using the PUCCH that corresponds to the specific CCE index of the plurality of PDCCHs detected on the single downlink carrier component or each of the plurality of downlink carrier components. The mobile station apparatus may transmit to the base station apparatus the control signal of HARQ using the specific PUCCH of the plurality of PUCCHs mapped on the single uplink carrier component or each of the plurality of uplink carrier components that correspond(s) to the single downlink carrier component or each of the plurality of downlink carrier components.

Figure 7:
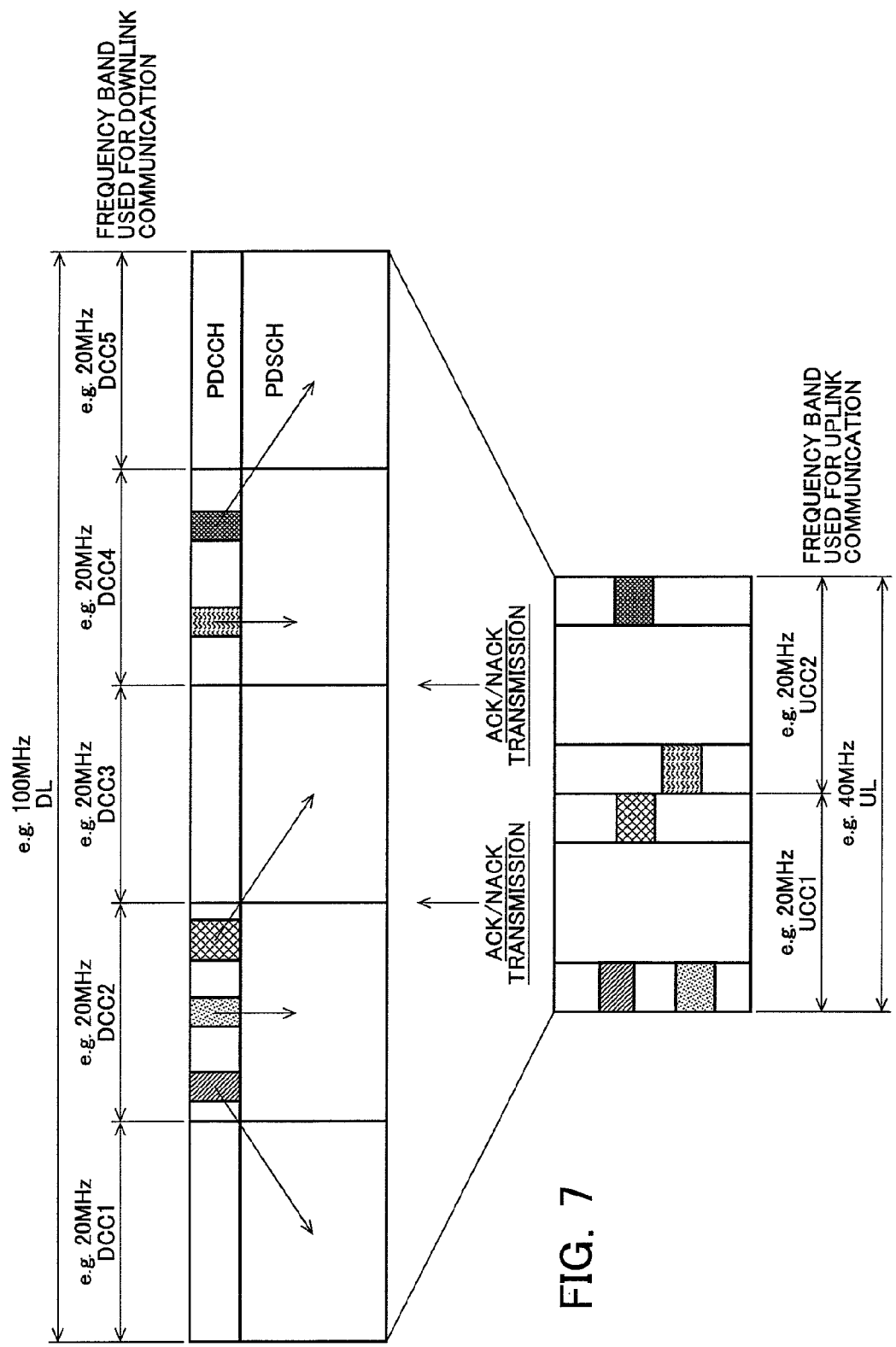
FIG. 7 is another diagram of an example of a mobile communication system to which the second embodiment is applicable.

FIG. 7 is a diagram of another example of the mobile communication system that the second embodiment is applicable to. FIG. 7 depicts the state as an example for explaining the second embodiment where a frequency band having a bandwidth of 100 MHz and used in the downlink communication includes five downlink carrier components (DCC1, DCC2, DCC3, DCC4, and DCC5) each having a bandwidth of 20 MHz. FIG. 7 also depicts the state where a frequency band having a bandwidth of 40 MHz and used in the uplink communication includes two uplink carrier components (UCC1 and UCC2) each having a bandwidth of 20 MHz. In FIG. 7, the downlink/uplink channels are mapped on each of the downlink/uplink carrier components. In FIG. 7, there may be downlink or uplink carrier component(s) on which any one of the downlink or uplink channels such as the PDCCH, the PDSCH, the PUCCH, or the PUSCH is not mapped.

In FIG. 7, the base station apparatus allocates the plurality of PDSCHs using the plurality of PDCCHs mapped on the single or the plurality of downlink carrier component(s). FIG. 7 depicts the state as an example where the base station apparatus allocates the PDSCHs mapped on DCC1, DCC2, and DCC3 using three PDCCHs mapped on DCC2 (the PDCCHs each indicated by slant lines, grid lines, or net lines). FIG. 7 also depicts the state where the base station apparatus allocates the PDSCHs mapped on DCC4 and DCC5 using two PDCCHs mapped on DCC4 (the PDCCHs each indicated by horizontal lines or a dotted pattern). The base station apparatus is able to transmit to the mobile station apparatus (at most five) downlink transport block(s) in one same sub frame using the PDSCHs mapped on DCC1, DCC2, DCC3, DCC4, and DCC5. The explicit allocation method or the implicit allocation method as described in the first embodiment may be used as the method for the base station apparatus to allocate the plurality of PDSCHs using the plurality of PDCCHs mapped on the single or the plurality of downlink carrier component(s).

The mobile station apparatus bundles or multiplexes for each of the downlink carrier components on which the plurality of PDCCHs are mapped the control signal of HARQ for the plurality of PDCCHs and/or the plurality of downlink transport blocks, and transmits the control signal bundled or multiplexed to the base station apparatus. FIG. 7 depicts the state as an example where the mobile station apparatus bundles or multiplexes in UCC1 that corresponds to DCC2 the control signal of HARQ for the plurality of PDCCHs transmitted using DCC2 and/or the downlink transport blocks transmitted using the PDSCHs of DCC1, DCC2, and DCC3, and transmits the control signal bundled or multiplexed to the base station apparatus using the PUCCH of UCC1. FIG. 7 also depicts the state where the mobile station apparatus bundles or multiplexes in UCC2 that corresponds to DCC4 the control signal of HARQ for the plurality of PDCCHs transmitted using DCC4 and/or the downlink transport blocks transmitted using the PDSCHs of DCC4 and DCC5, and transmits the control signal bundled or multiplexed to the base station apparatus using the PUCCH of UCC2. In this case, the transmission of the control signal of HARQ bundled or multiplexed in UCC1, and the transmission of the control signal of HARQ bundled or multiplexed in UCC2 are executed in the same one sub frame.

As above, the base station apparatus is able to set specifically to the cell or specifically to the mobile station apparatus the correspondence between the single or the plurality of downlink carrier component(s) on which the plurality of PDCCHs are mapped and the single or the plurality of uplink carrier component(s), using the physical broadcast channel or the RRC signaling. FIG. 7 depicts the state where the base station apparatus sets for the mobile station apparatus the correspondence between DCC2 and UCC1 and the correspondence between DCC4 and UCC2 using the physical broadcast channel or the RRC signaling. The base station apparatus is able to set specifically to the cell or specifically to the mobile station apparatus the single or the plurality of downlink carrier component(s) on which the plurality of PDCCHs are mapped, using the physical broadcast channel or the RRC signaling. The base station apparatus is further able to set specifically to the cell or specifically to the mobile station apparatus the single or the plurality of uplink carrier component(s) for the mobile station apparatus to transmit the control signal of HARQ, using the physical broadcast channel or the RRC signaling.

Figure 8:
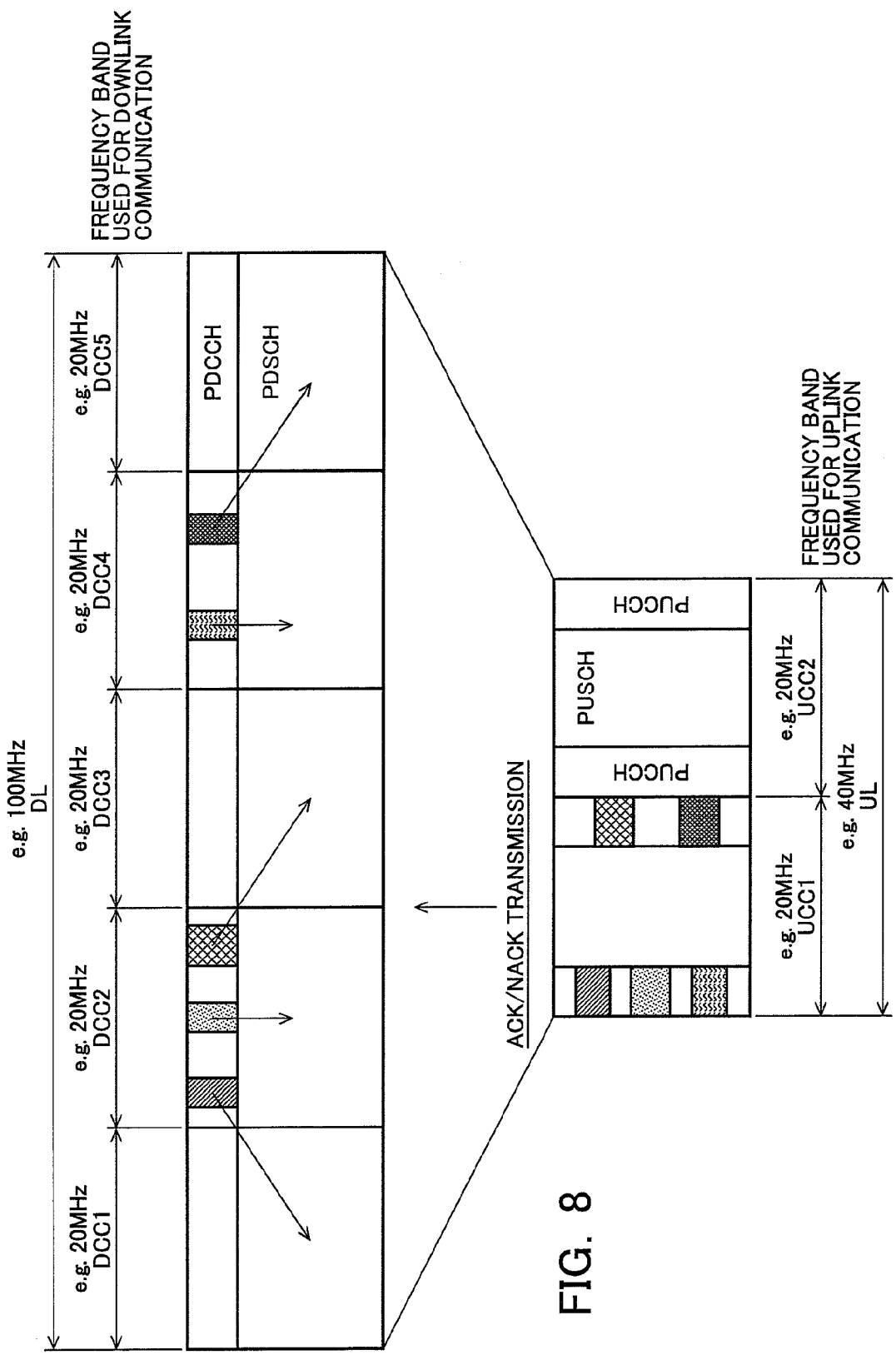
FIG. 8 is a further diagram of an example of a mobile communication system to which the second embodiment is applicable.
Figure 9:
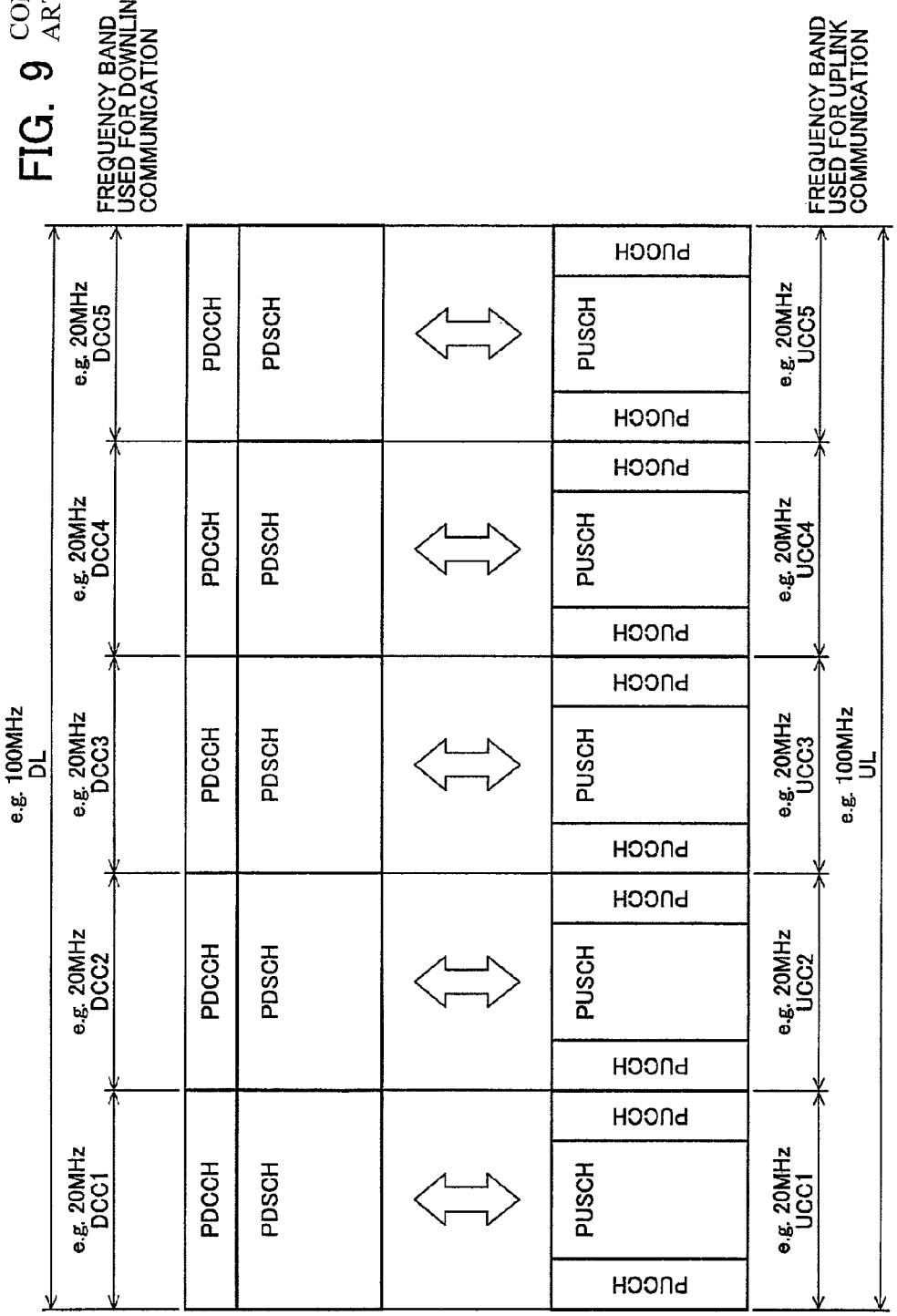
FIG. 9 is a diagram of uplink and downlink frequency bands according to the conventional technique.
Figure 10:
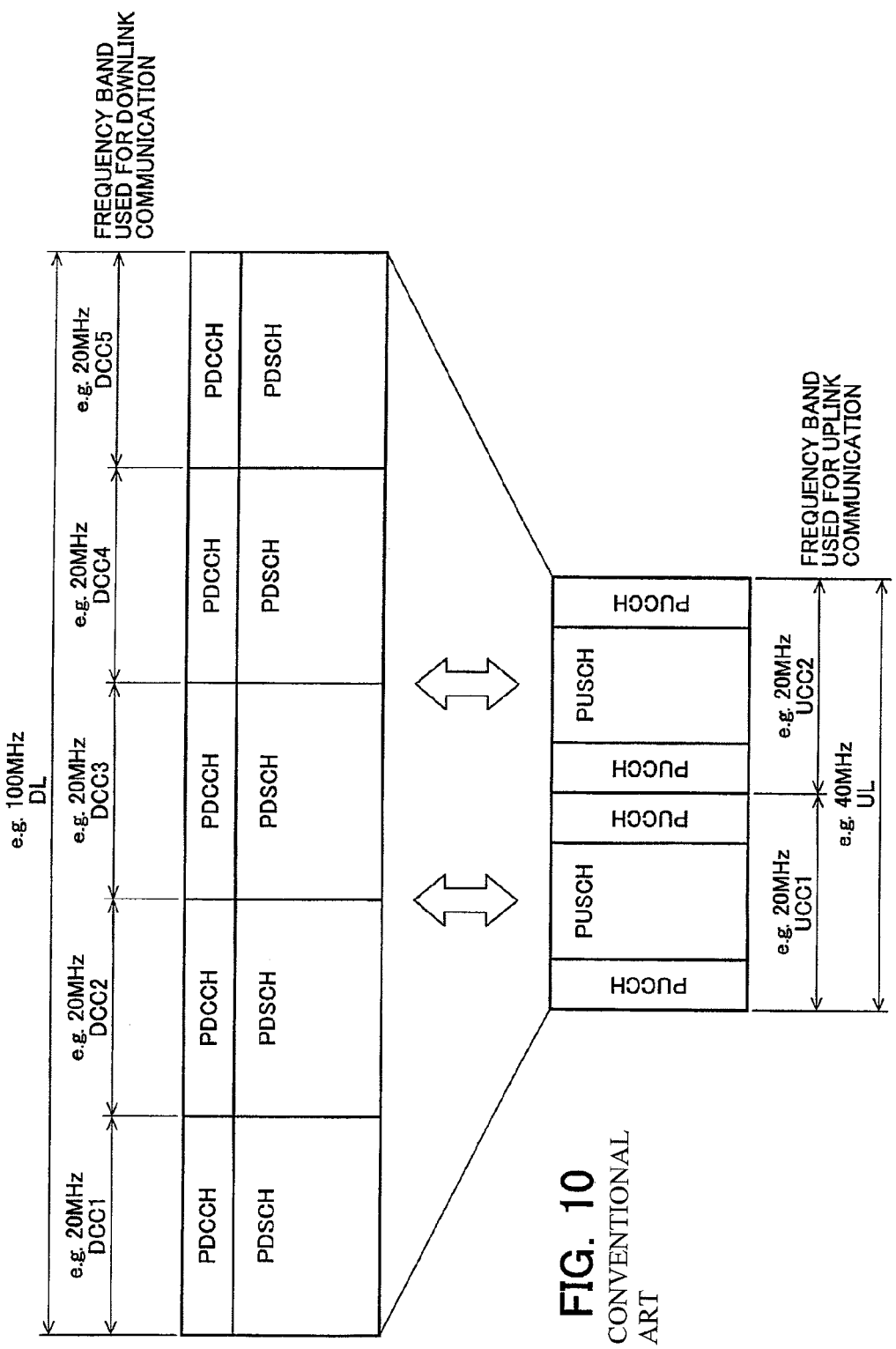
FIG. 10 is a diagram of the uplink and the downlink frequency bands according to the conventional technique.
Figure 11:
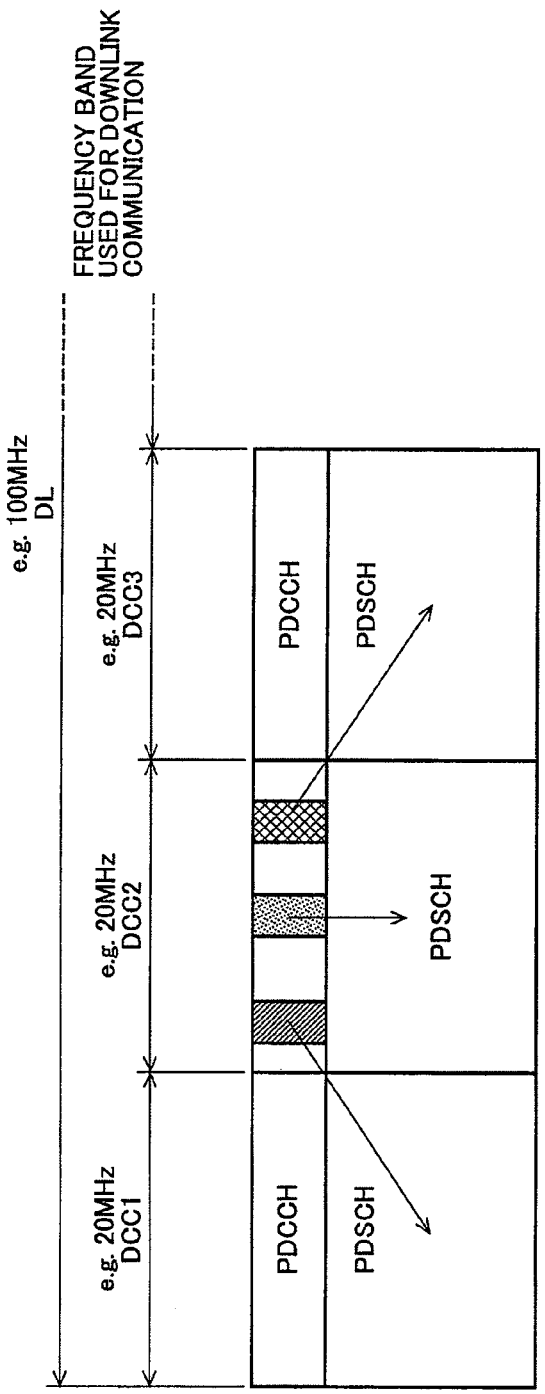
FIG. 11 is a diagram of a method of allocating physical downlink shared channels by physical downlink control channels according to the conventional technique.

FIG. 8 is a diagram of another example of the mobile communication system that the second embodiment is applicable to. In FIG. 8, the mobile station apparatus bundles or multiplexes for each of the downlink carrier components on which the plurality of PDCCHs are mapped the control signal of HARQ for the plurality of PDCCHs and/or the plurality of downlink transport blocks, and transmits the control signal bundled or multiplexed to the base station apparatus using the PUCCH mapped on the single uplink carrier component, and other points are similar to those of the mobile communication system described with reference to FIG. 7.

In FIG. 8, the base station apparatus makes DCC2 and UCC1 correspond and further makes DCC4 and UCC1 correspond, using the physical broadcast channel or the RRC signaling.

The mobile station apparatus bundles or multiplexes the control signal of HARQ for each of the downlink carrier components on which the plurality of PDCCHs are mapped, and transmits the control signal bundled or multiplexed to the base station apparatus using the PUCCH mapped on the single uplink carrier component that corresponds to the plurality of downlink carrier components. In FIG. 8, the mobile station apparatus bundles or multiplexes in UCC1 the control signal of HARQ for the plurality of PDCCHs transmitted using DCC2 and/or the downlink transport blocks transmitted using the PDSCHs of DCC1, DCC2, and DCC3 and transmits the control signal bundled or multiplexed to the base station apparatus using the PUCCH of UCC1. The mobile station apparatus further bundles or multiplexes in UCC1 the control signal of HARQ for the plurality of PDCCHs transmitted using DCC4 and/or the downlink transport blocks transmitted using the PDSCHs of DCC4 and DCC3 and transmits the control signal bundled or multiplexed to the base station apparatus using the PUCCH of UCC1. The mobile station apparatus transmits to the base station apparatus each of the control signals of HARQ bundled or multiplexed, using the one same sub frame.

As above, in the second embodiment, the base station apparatus allocates the plurality of PDSCHs using the plurality of PDCCHs mapped on the single or the plurality of downlink carrier components, and transmits to the mobile station apparatus the plurality of downlink transport blocks in one same sub frame using the plurality of PDSCHs allocated. The mobile station apparatus bundles or multiplexes for each of the downlink carrier components on which the plurality of PDCCHs are mapped the control signal of HARQ for the plurality of PDCCHs and/or the plurality of downlink transport blocks, and transmits the control signal bundled or multiplexed to the base station apparatus. The base station apparatus receives from the mobile station apparatus the control signal of HARQ bundled or multiplexed for each of the downlink carrier components. The base station apparatus and the mobile station apparatus transmit and receive the control signal of HARQ in this manner, and thereby the mobile station apparatus is able to: transmit the control signal of HARQ for each of the downlink carrier components on which the plurality of PDCCHs are mapped, and more flexibly control the transmission power for the mobile station apparatus to transmit the control signal of HARQ to the base station apparatus. The base station apparatus is able to designate the resources of the PUCCHs for the mobile station apparatus to map therein the control signal of HARQ, based on the positions in the PDCCH resource areas in the plurality o PDCCHs mapped on the single or the plurality of downlink carrier components; and, therefore, execute efficient allocation. When the mobile station apparatus bundles the control signal of HARQ and transmits the control signal bundled to the base station apparatus, the mobile station apparatus transmits to the base station apparatus the control signal of HARQ using the specific PUCCH, and thereby the base station apparatus is able to detect up to which PDCCH the mobile station apparatus is successfully receives (detects).

The above embodiments are also applied to an integrated circuit or a chip set loaded on each of the base station apparatus and the mobile station apparatus. In the above embodiments, programs to realize the functions in the base station apparatus and the functions in the mobile station apparatus may be recorded on a computer-readable recording medium a computer system may be caused to read and execute the programs recorded on the recording medium and thereby the base station apparatus and the mobile station apparatus may be controlled. The "computer system" used herein refers to a computer system that includes an OS and hardware such as a peripheral device.

The "computer-readable recording medium" refers to a portable medium such as a flexible disc, a magneto-optical disc, a ROM, or a CD-ROM, or a storing apparatus such as a hard disc incorporated in the computer system. The "computer-readable recording medium" may include a type thereof that dynamically retains the programs for a short time period such as a communication cable used when the programs are transmitted through a network such as the Internet or a communication line such as a telephone line and, in such a case, a type thereof that retains the programs for a specific time period such as a volatile memory in a computer system used as a server or a client. The "programs" may be programs to realize a part of the above functions, or may also be programs that are able to realize the above functions in combination with the programs already recorded in the computer system.

As above, the embodiments of the present invention have been described in detail with reference to the accompanying drawings. However, the specific configuration thereof is not limited to any one of those in the above embodiments and designs, etc., within the scope not departing from the purview of the present invention are included in the claims.

As above, the following measures may be taken for the present invention. The mobile communication system of the present invention is a mobile communication system including a base station apparatus and a mobile station apparatus, and the mobile communication system is characterized in that the base station apparatus using a plurality of physical downlink control channels mapped on single downlink carrier component, allocates a plurality of physical downlink shared channels to be mapped on the carrier component or a carrier component that is different from the carrier component; and, using the plurality of physical downlink shared channels allocated, transmits to the mobile station apparatus a plurality of downlink transport blocks in one same sub frame, and the mobile station apparatus: bundles control signals in HARQs (Hybrid Automatic Repeat reQuest) for the plurality of physical downlink control channels and/or the plurality of downlink transport blocks, in the one uplink carrier component that corresponds to the one downlink carrier component; and transmits the control signals bundled to the base station apparatus.

The mobile communication system including a base station apparatus and a mobile station apparatus, is characterized in that the base station apparatus using the plurality of physical downlink control channels mapped on the single or the plurality of downlink carrier component(s), allocates the plurality of physical downlink shared channels to be mapped on the carrier component or a carrier component different from the carrier component; and, using the plurality of physical downlink shared channels allocated, transmits to the mobile station apparatus the plurality of downlink transport blocks in the one same sub frame, and the mobile station apparatus: bundles the control signals in the HARQs for the plurality of physical downlink control channels and/or the plurality of downlink transport blocks, for each of downlink carrier components on which the plurality of physical downlink control channels are mapped; and transmits the control signal bundled to the base station apparatus.

The mobile communication system including a base station apparatus and a mobile station apparatus, is characterized in that the base station apparatus using the plurality of physical downlink control channels, allocates the plurality of physical downlink shared channels; and, using the plurality of physical downlink shared channels allocated, transmits to the mobile station apparatus the plurality of downlink transport blocks in the one same sub frame, and the mobile station apparatus: using a physical uplink control channel that corresponds to the physical downlink control channel finally detected of the plurality of physical downlink control channels, bundles the control signal of HARQs for the plurality of physical downlink control channels and/or the plurality of downlink transport blocks; and transmits the control signal bundled to the base station apparatus.

The mobile communication system including a base station apparatus and a mobile station apparatus, is characterized in that the base station apparatus: using the plurality of physical downlink control channels, allocates the plurality of physical downlink shared channels; and, using the plurality of physical downlink shared channels allocated, transmits to the mobile station apparatus the plurality of downlink transport blocks in the one same sub frame, and the mobile station apparatus: using a physical uplink control channel that corresponds to a specific control channel component of the plurality of physical downlink control channels, bundles the control signal of HARQ for the plurality of physical downlink control channels and/or the plurality of downlink transport blocks; and transmits the control signal bundled to the base station apparatus.

The mobile communication system including a base station apparatus and a mobile station apparatus, is characterized in that the base station apparatus: using the plurality of physical downlink control channels, allocates the plurality of physical downlink shared channels; and, using the plurality of physical downlink shared channels allocated, transmits to the mobile station apparatus the plurality of downlink transport blocks in the one same sub frame, and the mobile station apparatus: bundles the control signal of HARQ for the plurality of physical downlink control channels and/or the plurality of downlink transport blocks; and, using a physical uplink control channel whose index is largest, transmits the control signal bundled to the base station apparatus.

The mobile communication system including a base station apparatus and a mobile station apparatus, is characterized in that the base station apparatus: using the plurality of physical downlink control channels mapped on the single downlink carrier component, allocates the plurality of physical downlink shared channels mapped on the carrier component or a carrier component different from the carrier component; and, using the plurality of physical downlink shared channels allocated, transmits to the mobile station apparatus the plurality of downlink transport blocks in the one same sub frame, and the mobile station apparatus: multiplexes in single uplink carrier component that corresponds to the single downlink carrier component the control signal of HARQ for the plurality of physical downlink control channels and/or the plurality of downlink transport blocks; and transmits the control signal multiplexed to the base station apparatus.

The mobile communication system including a base station apparatus and a mobile station apparatus, is characterized in that the base station apparatus: using the plurality of physical downlink control channels mapped on single or a plurality of downlink carrier component(s), allocates the plurality of physical downlink shared channels to be mapped on the carrier component or a carrier component different from the carrier component; and, using the plurality of physical downlink shared channels allocated, transmits to the mobile station apparatus the plurality of downlink transport blocks in the one same sub frame, and the mobile station apparatus: multiplexes for each of the downlink carrier components on which the plurality of physical downlink control channels are mapped the control signal of HARQ for the plurality of physical downlink control channels and/or the plurality of downlink transport blocks; and transmits the control signal multiplexed to the base station apparatus.

The control signal of HARQ are characterized in that the control signal is signal that indicates ACK (ACKnowledgment)/NACK (Negative ACKnowledgment) and/or DTX (Discontinuous Transmission) for each of the plurality of physical downlink control channels and/or the plurality of downlink transport blocks.

A base station apparatus in a mobile communication system that includes the base station apparatus and a mobile station apparatus, is characterized in that the base station apparatus includes: a portion that, using a plurality of physical downlink control channels mapped on single downlink carrier component, allocates a plurality of physical downlink shared channels to be mapped on the carrier component or a carrier component different from the carrier component; a portion that, using the plurality of physical downlink shared channels allocated, transmits to the mobile station apparatus a plurality of downlink transport blocks in one same sub frame; and a portion that receives from the mobile station apparatus control signal of HARQ, bundled in single uplink carrier component that corresponds to the single downlink carrier component and for the plurality of physical downlink control channels and/or the plurality of downlink transport blocks.

The base station apparatus in a mobile communication system that includes the base station apparatus and a mobile station apparatus, is characterized in that the base station apparatus includes: a portion that, using the plurality of physical downlink control channels mapped on the single or the plurality of downlink carrier component(s), allocates the plurality of physical downlink shared channels to be mapped on the carrier component or a carrier component different from the carrier component; a portion that, using the plurality of physical downlink shared channels allocated, transmits to the mobile station apparatus the plurality of downlink transport blocks in one same sub frame; and a portion that receives from the mobile station apparatus the control signal of HARQ, bundled for each of the downlink carrier components disposed with the plurality of physical downlink control channels and for the plurality of physical downlink control channels and/or the plurality of downlink transport blocks.

The base station apparatus in a mobile communication system that includes the base station apparatus and a mobile station apparatus, is characterized in that the base station apparatus includes: a portion that, using the plurality of physical downlink control channels, allocates the plurality of physical downlink shared channels; a portion that, using the plurality of physical downlink shared channels allocated, transmits to the mobile station apparatus the plurality of downlink transport blocks in one same sub frame; and a portion that, using a physical uplink control channel that corresponds to a physical downlink control channel finally detected by the mobile station apparatus, of the plurality of physical downlink control channels, receives from the mobile station apparatus the control signal of HARQ bundled by the mobile station apparatus and for the plurality of physical downlink control channels and/or the plurality of downlink transport blocks.

The base station apparatus in a mobile communication system that includes the base station apparatus and a mobile station apparatus, is characterized in that the base station apparatus includes: a portion that, using the plurality of physical downlink control channels, allocates the plurality of physical downlink shared channels; a portion that, using the plurality of physical downlink shared channels allocated, transmits to the mobile station apparatus the plurality of downlink transport blocks in one same sub frame; and a portion that, using a physical uplink control channel that corresponds to a specific control channel component of the plurality of physical downlink control channels, receives from the mobile station apparatus the control signal of HARQ, bundled by the mobile station apparatus and for the plurality of physical downlink control channels and/or the plurality of downlink transport blocks.

The base station apparatus in a mobile communication system that includes the base station apparatus and a mobile station apparatus, is characterized in that the base station apparatus includes: a portion that, using the plurality of physical downlink control channels, allocates the plurality of physical downlink shared channels; a portion that, using the plurality of physical downlink shared channels allocated, transmits to the mobile station apparatus the plurality of downlink transport blocks in one same sub frame; and a portion that, using a physical uplink control channel whose index is largest, receives from the mobile station apparatus the control signals of HARQ, bundled by the mobile station apparatus and for the plurality of physical downlink control channels and/or the plurality of downlink transport blocks.

The base station apparatus in a mobile communication system that includes the base station apparatus and a mobile station apparatus, is characterized in that the base station apparatus includes: a portion that, using the plurality of physical downlink control channels mapped on single downlink carrier component, allocates the plurality of physical downlink shared channels to be mapped on the carrier component or a carrier component different from the carrier component; a portion that, using the plurality of physical downlink shared channels allocated, transmits to the mobile station apparatus the plurality of downlink transport blocks in one same sub frame; and a portion that receives from the mobile station apparatus the control signal HARQ, multiplexed in single uplink carrier component that corresponds to the single downlink carrier component and for the plurality of physical downlink control channels and/or the plurality of downlink transport blocks.

The base station apparatus in a mobile communication system that includes the base station apparatus and a mobile station apparatus, is characterized in that the base station apparatus includes: a portion that, using the plurality of physical downlink control channels mapped on single or a plurality of downlink carrier component(s), allocates the plurality of physical downlink shared channels to be mapped on the carrier component or a carrier component different from the carrier component; a portion that, using the plurality of physical downlink shared channels allocated, transmits to the mobile station apparatus the plurality of downlink transport blocks in one same sub frame; and a portion that receives from the mobile station apparatus the control signal of HARQ, multiplexed for each of the downlink carrier components disposed with the plurality of physical downlink control channels and for the plurality of physical downlink control channels and/or the plurality of downlink transport blocks.

The control signal of HARQ are characterized in that the control signal is a signal that each indicate ACK/NACK and/or DTX for each of the plurality of physical downlink control channels and/or the plurality of downlink transport blocks.

A mobile station apparatus in a mobile communication system that includes a base station apparatus and the mobile station apparatus, is characterized in that the base station apparatus, using a plurality of physical downlink control channels disposed in one downlink carrier component, allocates a plurality of physical downlink shared channels to be mapped on the carrier component or a carrier component different from the carrier component, and in that the mobile station apparatus includes: a portion that receives from the base station apparatus in one same sub frame a plurality of downlink transport blocks transmitted using the plurality of physical downlink shared channels allocated; and a portion that bundles control signal of HARQ for the plurality of physical downlink control channels and/or the plurality of downlink transport blocks, in one uplink carrier component corresponding to the one downlink carrier component and that transmits the control signals bundled to the base station apparatus.

The mobile station apparatus in a mobile communication system that includes a base station apparatus and the mobile station apparatus, is characterized in that the base station apparatus, using the plurality of physical downlink control channels disposed in the one or the plurality of downlink carrier component(s), allocates the plurality of physical downlink shared channels to be mapped on the carrier component or a carrier component different from the carrier component, and in that the mobile station apparatus includes: a portion that receives from the base station apparatus the plurality of downlink transport blocks in one same sub frame transmitted using the plurality of physical downlink shared channels allocated; and a portion that bundles the control signal of HARQ for the plurality of physical downlink control channels and/or the plurality of downlink transport blocks, for each downlink carrier component on which the plurality of physical downlink control channels are mapped and that transmits the control signal bundled to the base station apparatus.

The mobile station apparatus in a mobile communication system that includes a base station apparatus and the mobile station apparatus, is characterized in that the mobile station apparatus includes: a portion that receives from the base station apparatus the plurality of downlink transport blocks in one same sub frame transmitted using the plurality of physical downlink shared channels allocated by the base station apparatus using the plurality of physical downlink control channels; and a portion that, using a physical uplink control channel corresponding to the physical downlink control channel finally detected of the plurality of physical downlink control channels, bundles the control signal of HARQ for the plurality of physical downlink control channels and/or the plurality of downlink transport blocks and that transmits the control signal bundled to the base station apparatus.

The mobile station apparatus in a mobile communication system that includes a base station apparatus and the mobile station apparatus, is characterized in that the mobile station apparatus includes: a portion that receives from the base station apparatus the plurality of downlink transport blocks in one same sub frame using the plurality of physical downlink shared channels allocated by the base station apparatus using the plurality of physical downlink control channels; and a portion that, using a physical uplink control channel that corresponds to a specific control channel component of the plurality of physical downlink control channels, bundles the control signal of HARQ for the plurality of physical downlink control channels and/or the plurality of downlink transport blocks and that transmits the control signal bundled to the base station apparatus.

The mobile station apparatus in a mobile communication system that includes a base station apparatus and the mobile station apparatus, is characterized in that the mobile station apparatus includes: a portion that receives from the base station apparatus the plurality of downlink transport blocks in one same sub frame using the plurality of physical downlink shared channels allocated by the base station apparatus using the plurality of physical downlink control channels; and a portion that bundles the control signal of HARQ for the plurality of physical downlink control channels and/or the plurality of downlink transport blocks and that transmits the control signal bundled to the base station apparatus using a physical uplink control channel whose index is largest.

The mobile station apparatus in a mobile communication system that includes a base station apparatus and the mobile station apparatus, is characterized in that the base station apparatus allocates the plurality of physical downlink shared channels to be mapped on the carrier component or a carrier component different from the carrier component using a plurality of physical downlink control channels mapped on the single downlink carrier component, and the mobile station apparatus includes a portion that receives from the base station apparatus the plurality of downlink transport blocks in one same sub frame transmitted using the plurality of physical downlink shared channels allocated and a portion that multiplexes the control signal of HARQ for the plurality of physical downlink control channels and/or the plurality of downlink transport blocks in single uplink carrier component corresponding to the single downlink carrier component, and transmits the control signal multiplexed to the base station apparatus.

A mobile communication system including a base station apparatus and a mobile station apparatus, is characterized in that the base station apparatus includes: a portion that, using a plurality of physical downlink control channels disposed in one or a plurality of downlink carrier component(s), allocates a plurality of physical downlink shared channels to be mapped on the carrier component(s) or a carrier component different from the carrier component(s), and that receives from the base station apparatus the plurality of downlink transport blocks in one same sub frame transmitted using the plurality of physical downlink shared channels allocated; and a portion that multiplexes control signal of HARQ for the plurality of physical downlink control channels and/or the plurality of downlink transport blocks for each downlink carrier component on which the plurality of physical downlink control channels are mapped and that transmits the control signal multiplexed to the base station apparatus.

The control signal of HARQ is characterized in that the control signal is signal that indicates ACK/NACK and/or /DTX for each of the plurality of physical downlink control channels and/or the plurality of downlink transport blocks.

EXPLANATIONS OF LETTERS OR NUMERALS

100 . . . base station apparatus; 101 . . . data control portion; 102 . . . transmission data modulating portion; 103 . . . radio portion; 104 . . . scheduling portion; 105 . . . channel estimating portion; 106 . . . reception data demodulating portion; 107 . . . data extracting portion; 108 . . . higher layer; 109 . . . antenna; 110 . . . radio resource control portion; 200 . . . mobile station apparatus; 201 . . . data control portion; 202 . . . transmission data modulating portion; 203 . . . radio portion; 204 . . . scheduling portion; 205 . . . channel estimating portion; 206 . . . reception data demodulating portion; 207 . . . data extracting portion; 208 . . . higher layer; 209 . . . antenna; and 210 . . . radio resource control portion.

The invention claimed is:

1. A mobile station apparatus that is configured to and/or programmed to communicate with a base station apparatus using a plurality of downlink component carriers, wherein the plurality of downlink component carriers includes a first downlink component carrier and a second downlink component carrier, the mobile station apparatus comprising:
 a receiving unit configured to and/or programmed to receive in a sub-frame, from the base station apparatus, a first physical downlink control channel and a second physical downlink control channel, wherein the first physical downlink control channel is used for indicating a first physical downlink shared channel transmission on the first downlink component carrier and the second physical downlink control channel is used for indicating a second physical downlink shared channel transmission on the second downlink component carrier;
 a scheduling unit configured to and/or programmed to determine a first physical uplink control channel resource based on the first physical downlink control channel and a second physical uplink control channel resource based on the second physical downlink control channel in a case that the first physical downlink control channel and the second physical downlink control channel are received in the sub-frame; and
 a transmitting unit configured to and/or programmed to transmit, to the base station apparatus, information on Hybrid Automatic Repeat Request (HARQ) using a single physical uplink control channel resource which is selected from the first physical uplink control channel resource and the second physical uplink control channel resource, wherein
 the first physical uplink control channel resource and the second physical uplink control channel resource are mapped on a single uplink component carrier that corresponds to the first downlink component carrier, and
 the information on HARQ includes information that is used for indicating a positive acknowledgment (ACK) or a negative acknowledgment (NACK) for each of downlink transport blocks transmitted on the first physical downlink shared channel and the second physical downlink shared channel.

2. A base station apparatus that is configured to and/or programmed to communicate with a mobile station apparatus using a plurality of downlink component carriers, wherein the plurality of downlink component carriers includes a first downlink component carrier and a second downlink component carrier, the base station apparatus comprising:
 a transmitting unit configured to and/or programmed to transmit in a sub-frame, to the mobile station apparatus, a first physical downlink control channel and a second physical downlink control channel, wherein the first physical downlink control channel is used for indicating a first physical downlink shared channel transmission on the first physical downlink component carrier and the second physical downlink control channel is used for indicating a second downlink shared channel transmission on the second downlink component carrier;
 a scheduling unit configured to and/or programmed to schedule a first physical uplink control channel resource based on the first physical downlink control channel and a second physical uplink control channel resource based on the second physical downlink control channel in a case that the first physical downlink control channel and the second physical downlink control channel are transmitted in the sub-frame; and
 a receiving unit configured to and/or programmed to receive, from the mobile station apparatus, information on Hybrid Automatic Repeat Request (HARQ) using a single physical uplink control channel resource which is selected, by the mobile station apparatus, from the first physical uplink control channel resource and the second physical uplink control channel resource, wherein
 the first physical uplink control channel resource and the second physical uplink control channel resource are scheduled on a single uplink component carrier that corresponds to the first downlink component carrier, and
 the information on HARQ includes information that is used for indicating a positive acknowledgment (ACK) or a negative acknowledgment (NACK) for each of downlink transport blocks transmitted on the first physical downlink shared channel and the second physical downlink shared channel.

3. A communication method of a mobile station apparatus that is configured to and/or programmed to communicate with a base station apparatus using a plurality of downlink component carriers, wherein the plurality of downlink component carriers includes a first downlink component carrier and a second downlink component carrier, the communication method comprising:
 receiving in a sub-frame, from the base station apparatus, a first physical downlink control channel and a second physical downlink control channel, wherein the first physical downlink control channel is used for indicating a first physical downlink shared channel transmission on the first downlink component carrier and the second physical downlink control channel is used for indicating a second physical downlink shared channel transmission on the second downlink component carrier;
 determining a first physical uplink control channel resource based on the first physical downlink control channel and a second physical uplink control channel resource based on the second physical downlink control channel in a case that the first physical downlink control channel and the second physical downlink control channel are received in the sub-frame; and transmitting, to the base station apparatus, information on Hybrid Automatic Repeat Request (HARQ) using a single physical uplink control channel resource which is selected from the first physical uplink control channel resource and the second physical uplink control channel resource, wherein the first physical uplink control channel resource and the second physical uplink control channel resource are mapped on a single uplink component carrier that corresponds to the first downlink component carrier, and the information on HARQ includes information that is used for indicating a positive acknowledgment (ACK) or a negative acknowledgment (NACK) for each of downlink transport blocks transmitted on the first physical downlink shared channel and the second physical downlink shared channel.

4. A communication method of a base station apparatus that is configured to and/or programmed to communicate with a mobile station apparatus using a plurality of downlink component carriers, wherein the plurality of downlink component carriers includes a first downlink component carrier and a second downlink component carrier, the communication method comprising:

transmitting in a sub-frame, to the mobile station apparatus, a first physical downlink control channel and a second physical downlink control channel, wherein the first physical downlink control channel is used for indicating a first physical downlink shared channel transmission on the first downlink component carrier and the second physical downlink control channel is used for indicating a second physical downlink shared channel transmission on the second downlink component carrier;

scheduling a first physical uplink control channel resource based on a the first physical downlink control channel and a second physical uplink control channel resource based on the second physical downlink control channel in a case that the first physical downlink control channel and the second physical downlink control channel are transmitted in the sub-frame; and receiving, from the mobile station apparatus, information on Hybrid Automatic Repeat Request (HARQ) using a single physical uplink control channel resource which is selected, by the mobile station apparatus, from the first physical uplink control channel resource and the second physical uplink control channel resource, wherein the first physical uplink control channel resource and the second physical uplink control channel resource are scheduled on a single uplink component carrier that corresponds to the first downlink component carrier, and the information on HARQ includes information that is used for indicating a positive acknowledgment (ACK) or a negative acknowledgment (NACK) for each of downlink transport blocks transmitted on the first physical downlink shared channel and the second physical downlink shared channel.

* * * * *